United States Patent Office 3,251,664
Patented May 17, 1966

3,251,664
FUEL COMPOSITIONS CONTAINING BRANCHED POLYALKYLENEPOLYAMINES AND DERIVATIVES THEREOF
Woodrow J. Dickson, La Habra, and Fred W. Jenkins, Buena Park, Calif., assignors to Petrolite Corporation
No Drawing. Original application Aug. 4, 1960, Ser. No. 47,386, now Patent No. 3,200,106, dated Aug. 10, 1965. Divided and this application Aug. 6, 1963, Ser. No. 300,149
32 Claims. (Cl. 44—66)

This application is a division of S.N. 47,386, filed August 4, 1960, now U.S. Patent No. 3,200,106.

This invention relates to branched polyalkylenepolyamines and to derivatives thereof. More particularly, this invention relates to said branched polyamines and to branched polyamine derivatives containing various groups, such as the oxyalkylated, acylated, alkylated, carbonylated, olefinated, etc., derivatives thereof, prepared by introducing such groups individually, alternately, in combination, etc., including for example, derivatives prepared by varying the order of adding such groups, by increasing the number and order of adding such groups, and the like.

This invention also relates to methods of using these products, which have an unexpectedly broad spectrum of uses, for example, as demulsifiers for water-in-oil emulsions; as demulsifiers for oil-in-water emulsions; as corrosion inhibitors; as fuel oil additives for gasoline, diesel fuel, jet fuel, and the like; as lubricating oil additives; as scale preventatives; as chelating agents or to form chelates which are themselves useful, for example, as antioxidants, gasoline stabilizers, fungicides, etc.; as flotation agents, for example, as flotation collection agents; as asphalt additives or anti-stripping agents for asphalt-mineral aggregate compositions; as additives for compositions useful in acidizing calcareous stratas of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline additives to remove copper therefrom; as deicing and anti-stalling agents for gasoline; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as entraining agents for concrete and cements; as anti-static agents for rugs, floors, upholstery, plastic and wax polishes, textiles, etc.; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners for pigment flushing, grinding and dispersing, as anti-feathering agents in ink; as agents in the preparation of wood pulp and pulp slurries, as emulsifiers for insecticidal compositions and agricultural sprays such as DDT, 24–D (Toxaphene), chlordane, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

THE BRANCHED POLYAMINE

The branched polyamines employed herein are polyalkylenepolyamines wherein the branched group is a side chain containing on the average at least one nitrogen-bonded aminoalkylene (i.e.

group per nine amino units present on the main chain, for example 1–4 of such branched chains per nine units on the main chain, but preferably one side chain unit per nine main chain units. Thus, these polyamines contain at least three primary amino groups and at least one tertiary amino group.

These reagents may be expressed by the formula:

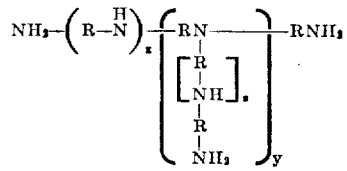

wherein R is an alkylene group such as ethylene, propylene, butylene and other homologues (both straight chained and branched), etc., but preferably ethylene; and x, y and z are integers, x being for example, from 4 to 24 or more but preferably 6 to 18, y being for example 1 to 6 or more but preferably 1 to 3, and z being for example 0–6 but preferably 0–1. The x and y units may be sequential, alternative, orderly or randomly distributed.

The preferred class of polyamines includes those of the formula:

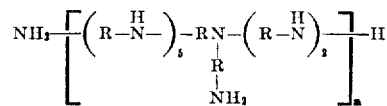

where n is an integer, for example 1–20 or more but preferably 1–3, wherein R is preferably ethylene, but may be propylene, butylene, etc. (straight chained or branched).

The preferred embodiments are presented by the following formula:

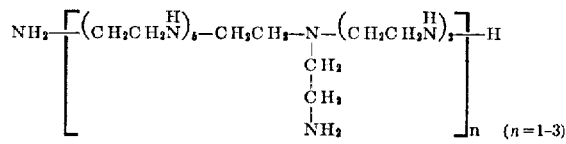

The radicals in the brackets may be joined in a head-to-head or a head-to-tail fashion. Compounds described by this formula wherein $n=1-3$ are manufactured and sold as Polyamines N–400, N–800, N–1200 etc. Polyamine N–400 has the above formula wherein $n=1$.

These compounds may be prepared by a wide variety of methods. One method comprises the reaction of ethanolamine and ammonia under pressure over a fixed bed of a metal hydrogenation catalyst. By controlling the conditions of this reaction one may obtain varying amounts of piperazine and polyamines as well as the branched chain polyalkylene polyamine useful in this invention. This process is described in Australian application No. 42,189, now Australian Patent No. 233,766, and in the East German Patent No. 14,480 (March 17, 1958) reported in Chem. Abstracts, August 10, 1949, 14129.

These branched polyamines can also be prepared by the following reactions:

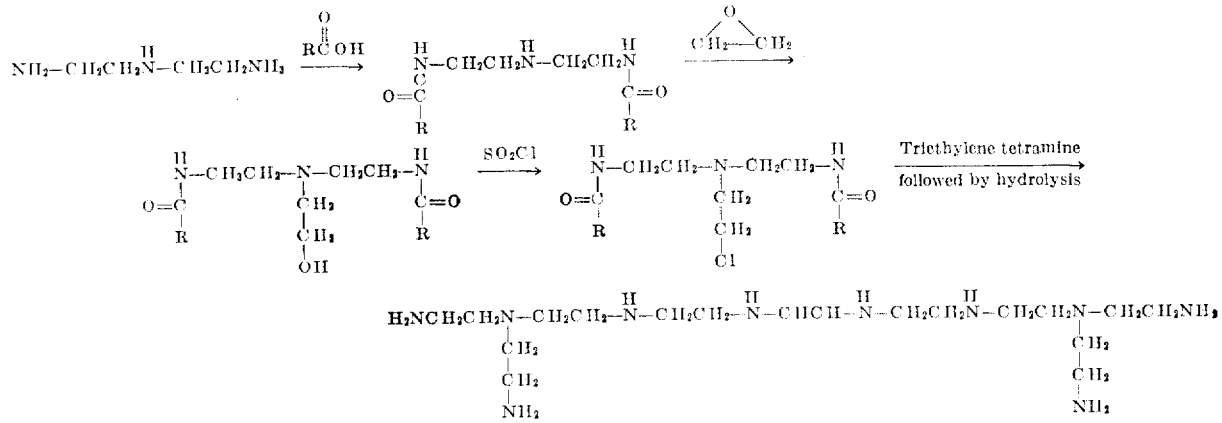

Variations on the above procedure can produce other branched polyamines.

The branched nature of the polyamine imparts unusual properties to the polyamine and its derivatives.

For the sake of brevity and to simplify presentation, the invention will be described by the selection of one branched polyamine to illustrate the reactions and uses thereof (i.e. N–400). However, it is to be understood that such presentation is purely for illustration and the invention should not be limited thereto.

ACYLATION

A wide variety of acylating agents can be employed. Acylation is carried out under dehydrating condition, i.e., water is removed. Any of the well-known methods of acylation can be employed. For example, heat alone, heat and reduced pressure, heat in combination with an azeotroping agent, etc., are all satisfactory.

The temperature at which the reaction between the acylating agent and the branched polyalkylenepolyamine is effected is not too critical a factor. Since the reactions involved appear to be an amide-formation reaction and a condensation reaction, the general temperature conditions for such reactions, which are well known to those skilled in the art, are applicable.

Acylation is conducted at a temperature sufficiently high to eliminate water and below the pyrolytic point of the reactants and the reaction products. In general, the reaction is carried out at a temperature of from 120° to 280° C., but preferably at 140° to 200° C.

The product formed on acylation will vary with the particular conditions employed. First the salt, then the amide is formed. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid group employed, the first mole of water being evolved during amidification. The product formed in such cases contains a cyclic amidine ring, such as an imidazoline or a tetrahydropyrimidine ring. Infrared analysis is a convenient method of determining the presence of these groups.

Water is formed as a by-product of the reaction between the acylating agent and the branched polyamine reactant. In order to facilitate the removal of this water, to effect a more complete reaction in accordance with the principle of Le Chatelier, a hydrocarbon solvent which forms an azeotropic mixture with water can be added to the reaction mixture. Heating is continued with the liquid reaction mixture at the preferred reaction temperature, until the removal of water by azeotropic distillation has substantially ceased. In general, any hydrocarbon solvent which forms an azeotropic mixture with water can be used. It is preferred, however, to use an aromatic hydrocarbon solvent of the benzene series. Non-limiting examples of the preferred solvent are benzene, toluene, and xylene. The amount of solvent used is a variable and non-critical factor. It is dependent on the size of the reaction vessel and the reaction temperature selected. Accordingly, a sufficient amount of solvent must be used to support the azeotropic distillation, but a large excess must be avoided since the reaction temperature will be lowered thereby. Water produced by the reaction can also be removed by operating under reduced pressure. When operating with a reaction vessel equipped with a reflux condenser provided with a water takeoff trap, sufficient reduced pressure can be achieved by applying a slight vacuum to the upper end of the condenser. The pressure inside the system is usually reduced to between about 50 and about 300 millimeters. If desired, the water can be removed also by distillation, while operating under relatively high temperature conditions.

The time of reaction between the acylating agent and the branched polyamine reactant is dependent on the weight of the charge, the reaction temperature selected, and the means employed for removing the water from the reaction mixture. In practice, the reaction is continued until the formation of water has substantially ceased. In general, the time of reaction will vary between about 4 hours and about ten hours.

Although a wide variety of carboxylic acids produce excellent products, carboxylic acids having more than 6 carbon atoms and less than 40 carbon atoms but preferably 8–30 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonacoic, capric, undecanoic, lauric, tridecanoic, myriatic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyelcosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof, e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are himimellitic, trimellitic, trimesic, mellophanic, prehnitic, pyromellitic acids, mellitic acid, and the like.

Other polycarboxylic acids are the dimeric, trimeric, and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as acid anhydrides, esters, acid halides, glycerides, etc., can be employed in place of the free acid.

Examples of acid anhydrides are the alkenyl succinic acid anhydrides.

Any alkenyl succinic acid anhydride or the corresponding acid is utilizable for the production of the reaction products of the present invention. The general structural formulae of these compounds are:

Anhydride

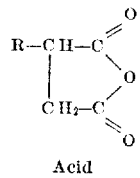

Acid

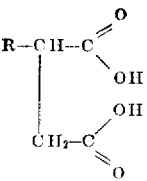

wherein R is an alkenyl radical. The alkenyl radical can be straight-chain or branched-chain; and it can be saturated at the point of unsaturation by the additon of a substance which adds to olefinc double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. Although their use is less desirable, the alkenyl succinc acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride," is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethyenyl succinic acid anhydrides; ethenyl succinic acid; ethyl succinic acid anhydride; propenyl succinic acid anhydride; sulfurized propenyl succinic acid anhydride; butenyl succinic acid; 2-methylbutenyl succinic acid anhydride; 1,2-dichloropentyl succinic acid anhydride; hexenyl succinic acid anhydride; hexyl succinic acid; sulfurized 3-methylpentenyl succinic acid anydride; 2,3-dimethylbutenyl succinic acid anhydride; 3,3-dimethylbutenyl succinic acid; 1,2-dibromo-2-ethylbutyl succinic acid; heptenyl succinic acid anyhdride; 1,2-diiodooctyl succinic acid; octenyl succinic acid anhydride; 2-methyl-heptenyl succinic acid anhydride; 4-ethylhexenyl succinic acid; 2-isopropylpentenyl succinic acid anhydride; noneyl succinic acid anhydride; 2-propylhexenyl succinic acid anhydride; decenyl succinic acid; decenyl succinic acid anhydride; 5-methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloro-undecyl succinic acid anhydride; 1,2-dichloro-undecyl succinic acid; 3-ethyl-2-t-butylpentenyl; succinic acid anhydride; dodecenyl succinic acid anhydride; dodecenyl succinic acid; 2-propylononeyl succinic acid anhydride; 3-butyloctenyl succinic acid anhydride; tri-decenyl succinic acid anhydride; tetradecenyl succinic acid anhydride; hexadecenyl succinic acid anhydride; sulfurized octadecenyl succinic acid; octadecyl succinic acid anhydride; 1,2-dibromo-2-methylpentadecenyl succinic acid anhydride; 8-propylpentadecyl succinic acid anhydride; eicosenyl succinic acid anyhdride; 1,2-dichloro-2-methylnonadecenyl succinic acid anyhdride; 2-octyldodecenyl succinic acid; 1,2-diiodotetracosenyl succinic acid anhydride; hexacosenyl succinic acid; hexacosenyl succinic acid anhydride; and hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anyhdrides are usaually prepared as mixtures by reacting mixtures of olefins with maleic acid anhydride. Such mixtures, as well as relatively pure anhydrides, are utilizable herein.

In summary, without any intent of limiting the scope of the invention, acylation includes amidification, the formation of the cyclic amidine ring, the formation of acid imides such as might occur when anhydrides such as the alkenylsuccinic acids are reacted, i.e.

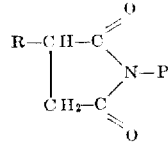

wherein P=branched polyamine residue polymers as might occur when a dicarboxylic acid is reacted intermolecularly with the branched polyamine, cyclization as might occur when a dicarboxylic acid reacts intramolecularly with the polyamine as contrasted to intermolecular reactions, etc. The reaction products may contain other substances. Accordingly, these reaction products are most accurately defined by a definition comprising a recitation of the process by which they are produced, i.e., by acylation.

The moles of acylating agent reacted with the branched polyamine will depend on the number of acylation reactive positions contained therein as well as the number of moles of acylating agent one wishes to incorporate into the molecule. We have advantageously reacted 1 to 10 moles of acylating agent per mole of Polyamine N-400, but preferably 1 to 6 moles. With Polyamine N-800 and N-1200, twice and three times as many moles of acylating agent can be employed respectively, i.e. with Polyamine N-800, 1-20 moles, preferably 1-12; with N-1200, 1-30, but preferably 1-18. Optimum acylation will depend on the particular application.

The following examples are illustrative of the preparation of the acylated branched polyamines.

The following general procedure is employed in acylating. The branched polyamine is mixed with the desired ratio of acid and a suitable azeotroping agent is added. Heat is then applied. After the removal of the calculated amount of water (1 to 2 equivalents per carboxylic acid group of the acid employed), heating is stopped and the azeotroping agent is evaporated under vacuum. The temperature during the reaction can vary from 80° to 200° C. Where the formation of the cyclic amidine type structure is desired the maximum temperature is generally 180-250° C. and more than one mole of water per carboxylic group is removed. The reaction times range from 4 to 24 hours. Here again, the true test of the degree of reaction is the amount of water removed.

*Example 3–A₂*

In a 5 liter, 3 necked flask furnished with a stirring device, thermometer, phase separating trap, condenser and heating mantle, 1 mole (400 grams) of Polyamine N-400 is dissolved in an equal weight of xylene, i.e., 400 grams. 845 grams of oleic acid (3 moles) is added to the polyamine with stirring in about ten minutes. The reaction mixture is then heated gradually to about 145° C. in half an hour and then held at about 160° C. over a period of 3 hours until 54 grams (3 moles) of water is collected in the side of the tube. The solvent is then removed with gentle heating under reduced pressure of approximately 20 mm. The product is a dark, viscous, xylene-soluble liquid.

*Example 3–A₃*

The prior example is repeated except that the final reaction temperature is maintained at 240° C. and 90 grams (5 moles) of water are removed instead of 54 grams (3 moles). Infrared analysis of the product indicates the presence of a cyclic amidine ring.

The following examples of acylated branched polyamines are prepared in the manner of the above examples from Polyamine N-400 by employing 400 grams of polyamine in each example. The products obtained are dark, viscous materials.

In the examples the symbol "A" identified the acylated branched polyamine. Thus, specifically "1-A," represents acylated Polyamine N-400, which polyamine is employed in all the reactions of the following table.

TABLE I.—ACYLATED PRODUCTS OF POLYAMINE N-400

| Ex. | Acid Name | Acid Grams | Moles of acid/mole of Polyamine N-400 | Water removed Moles | Water removed Grams |
|---|---|---|---|---|---|
| 1-A₁ | Acetic (60) | 540 | 9:1 | 10.1 | 182 |
| 1-A₂ | do | 400 | 8:1 | 10.1 | 182 |
| 1-A₃ | do | 420 | 7:1 | 9.2 | 166 |
| 1-A₄ | do | 300 | 5:1 | 7.1 | 128 |
| 1-A₅ | do | 180 | 3:1 | 5.3 | 95 |
| 1-A₆ | do | 60 | 1:1 | 2.0 | 36 |
| 2-A₁ | Nonanoic (158) | 790 | 5:1 | 7.2 | 129 |
| 2-A₂ | do | 632 | 4:1 | 6.0 | 108 |
| 2-A₃ | do | 474 | 3:1 | 5.1 | 92 |
| 3-A₁ | Oleic (282) | 1,692 | 6:1 | 5.9 | 106 |
| 3-A₂ | do | 845 | 3:1 | 3.0 | 54 |
| 3-A₃ | do | 845 | 3:1 | 5.0 | 90 |
| 4-A₁ | Stearic (284) | 1,136 | 4:1 | 5.9 | 106 |

TABLE I—Continued

| Ex. | Acid | | Moles of acid/mole of Polyamine N-400 | Water removed | |
|---|---|---|---|---|---|
| | Name | Grams | | Moles | Grams |
| 4-A₂ | ----do---- | 852 | 3:1 | 3.2 | 58 |
| 4-A₃ | ----do---- | 284 | 1:1 | 1.1 | 20 |
| 5-A₁ | Lauric (200) | 600 | 3:1 | 3.0 | 54 |
| 5-A₂ | ----do---- | 400 | 2:1 | 2.2 | 40 |
| 6-A₁ | Myristic (228.4) | 685.2 | 3:1 | 5.3 | 95 |
| 6-A₂ | ----do---- | 456.8 | 2:1 | 3.0 | 54 |
| 7-A₁ | Palmitic (256.4) | 1,025.6 | 4:1 | 6.2 | 112 |
| 7-A₂ | ----do---- | 769.2 | 3:1 | 4.5 | 81 |
| 8-A₁ | Dimeric (600) | 300 | 0.5:1 | 1.9 | 35 |
| 8-A₂ | ----do---- | 400 | 0.66:1 | 4.1 | 74 |
| 8-A₃ | ----do---- | 1,800 | 3:1 | 6.3 | 113 |
| 9-A₁ | Alkenyl (C₁₂) succinic. | 1,064 | 4:1 | 6.1 | 111 |
| 9-A₂ | Anhydride (266) | 798 | 3:1 | 3.2 | 58 |
| 9-A₃ | ----do---- | 532 | 2:1 | 0.3 | 5.4 |
| 10-A₁ | Alkenyl (C₁₆) succinic. | 966 | 3:1 | 5.2 | 94 |
| 10-A₂ | Anhydride (322) | 644 | 2:1 | 2.1 | 38 |
| 10-A₃ | ----do---- | 644 | 2:1 | 0.2 | 3.6 |
| 11-A₁ | Diphenolic (286) | 858 | 3:1 | 5.0 | 90 |
| 11-A₂ | ----do---- | 286 | 1:1 | 1.2 | 22 |
| 12-A₁ | Oiticica oil¹ (920) | 460 | 0.5:1 | 1.1 | 20 |
| 12-A₂ | ----do---- | 920 | 1:1 | 1.2 | 22 |
| 13-A₁ | Benzoic (122) | 610 | 5:1 | 4.7 | 85 |
| 13-A₂ | ----do---- | 366 | 3:1 | 3.1 | 56 |
| 13-A₃ | ----do---- | 244 | 2:1 | 2.3 | 41 |
| 14-A₁ | Diglycolic (134) | 134 | 1:1 | 1.0 | 18 |
| 14-A₂ | ----do---- | 107.2 | 0.8:1 | 0.8 | 14 |
| 14-A₃ | ----do---- | 67 | 0.5:1 | 0.5 | 9 |
| 15-A₁ | Maleic anhydride (98). | 98 | 1:1 | 0.2 | 36 |
| 15-A₂ | ----do---- | 78.4 | 0.8:1 | 0.0 | |
| 15-A₃ | ----do---- | 49 | 0.5:1 | 0.1 | 1.8 |
| 16-A₁ | Naphthenic (330) (Sunaptic Acid B). | 990 | 3:1 | 3 | 54 |
| 17-A₁ | Terephthalic (166) | 332 | 2:1 | 4 | 72 |
| 17-A₂ | ----do---- | 498 | 3:1 | 5 | 90 |
| 17-A₃ | ----do---- | 830 | 5:1 | 6 | 108 |

¹ Chief substituent of oiticica oil is the glyceride of licanic acid:

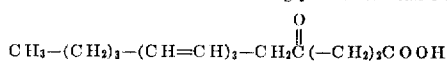

The following table presents specific illustration of compounds other than N-400 and its derivatives.

TABLE I-A.—ACYLATED PRODUCTS

| Example | Branched polyamine | Acid | | Mols of acid per mols of branched polyamine | Water removed | |
|---|---|---|---|---|---|---|
| | | Name | Grams | | Moles | Grams |
| 18-A₁ | N-800 | Oleic (282) | 564 | 2:1 | 2.2 | 39.6 |
| 18-A₂ | N-800 | ----do---- | 282 | 1:1 | 1.9 | 34.2 |
| 19-A₁ | N-800 | Dimeric (600) | 1,800 | 3:1 | 2.9 | 52.3 |
| 19-A₂ | N-800 | ----do---- | 1,200 | 2:1 | 2.1 | 37.8 |
| 20-A₁ | N-800 | Alkenyl succinic anhydride (266) | 532 | 2:1 | | |
| 20-A₂ | N-800 | ----do---- | 266 | 1:1 | | |
| 21-A | N-800 | Diglycolic (134) | 134 | 1:1 | 1.0 | 18 |
| 22-A | N-800 | Maleic anhydride (98) | 98 | 1:1 | | |
| 23-A | N-800 | Naphthenic (33) (Sunaptic acid B) | 330 | 1:1 | 2.1 | 37.8 |
| 24-A | N-800 | Acetic (60) | 60 | 1:1 | 1.1 | 19.6 |
| 25-A | N-800 | Diphenolic (286) | 286 | 1:1 | 1.1 | 19.6 |
| 26-A₁ | N-1200 | Stearic (284) | 568 | 2:1 | 1.8 | 32.4 |
| 26-A₂ | N-1200 | ----do---- | 284 | 1:1 | 1.9 | 34.2 |
| 27-A | N-1200 | Dimeric (600) | 600 | 1:1 | 1.1 | 19.6 |
| 28-A | N-1200 | Benzoic (122) | 122 | 1:1 | 0.9 | 16.2 |
| 29-A | N-1200 | Terephthalic (166) | 166 | 1:1 | 0.8 | 14.4 |
| 30-A | N-1200 | Diphenolic (286) | 286 | 1:1 | 1.0 | 18.0 |
| 31-A | N-1200 | Lauric (200) | 200 | 1:1 | 1.2 | 21.6 |
| 32-A₁ | N-1200 | Oleic (282) | 846 | 3:1 | 3.1 | 55.8 |
| 32-A₂ | N-1200 | ----do---- | 564 | 2:1 | 1.9 | 34.2 |
| 32-A₃ | N-1200 | ----do---- | 282 | 1:1 | 1.0 | 18.0 |
| 33-A | N-1200 | Acetic (60) | 240 | 4:1 | 4.0 | 72.0 |

OXYALKYLATION

These branched polyamines can be oxyalkylated in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions or propylene oxide and ethylene oxide, or smaller proportion thereof in relation to the branched polyamine. Thus, the molar ratio of alkylene oxide to branched polyamine can range within wide limits, for example, from a 1:1 mole ratio to a ratio of 1000:1, or higher, but preferably 1 to 200. For example, in demulsification extremely high alkylene oxide ratios are often advantageously employed such as 200–300 or more moles of alkylene oxide per mole of branched polyamine. On the other hand, for certain application such as corrosion prevention and use as fuel oil additives, lower ratios of alkylene oxide are advantageously employed, i.e. 1–10–25 moles of alkylene oxide per mole of branched polyamine. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

Oxyalkylation is too well known to require a full discussion. For purpose of brevity reference is made to Parts 1 and 2 of U.S. Patent No. 2,792,371, dated May 14, 1957, to Dickson in which particular attention is directed to the various patents which describe typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Texas. Note also the extensive bibliography in this bulletin and the large number of patents which deal with oxyalkylation processes.

The symbol employed to designate oxyalkylation is "O." Specifically "1-O" representes oxyalkylated Polyamine N-400.

In the following oxyalkylations the reaction vessel employed is a stainless steel autoclave equipped with the usual devices for heating and heat control, a stirrer, inlet and outlet means and the like which are conventional in this type of apparatus. The stirrer is operated at a speed of 250 r.p.m. The branched polyamine, Polyamine N-400, dissolved in an equal weight of xylene is charged into the reactor. The autoclave is sealed, swept with nitrogen, stirring started immediately and heat applied. The temperature is allowed to rise approximately 100° C. at which time the addition of the alkylene oxide is started and added continuously at such speed as it is absorbed by the reaction mixture. When the rate of oxyalkylation slows down appreciably, which generally occurs after about 15 moles of ethylene oxide are added or after about 10 moles of propylene oxide are added, the reaction vessel is opened and an oxyalkylation catalyst is added (in 2 weight percent of the total reactants present). The catalyst employed in the examples is sodium methylate. Thereupon the autoclave is flushed out as before and oxyalkylation completed. In the case of oxybutylation, oxyoctylation, oxystyrenation, and other oxyalkylations, etc., the catalyst is added at the beginning of the operation.

*Example 1–$O_1$*

Using the oxyalkylation apparatus and procedure stated above, the following compounds are prepared: 400 grams (1 mol) of Polyamine 400 are charged into a stainless steel autoclave, swept with nitrogen, stirring started, and autoclave sealed. The temperature is allowed to rise to approximately 100° C. and ethylene oxide is injected continuously until 220 grams (5 mols) total had been added over a one-half hour period. This reaction is exothermic and requires cooling to avoid a rise in temperature. The reaction mass is transferred to a suitable container. Upon cooling to room temperature, the reaction mass is a dark extremely viscous liquid.

*Example 1–$O_2$*

The same procedure as Example 1–$O_1$ is used exactly except that 396 grams of ethylene oxide (9 mols) is added to 400 grams (1 mol) of Polyamine N–400. This reaction material is a dark viscous liquid at room temperature.

*Example 1–$O_3$*

The same procedure as Example 1–$O_1$ is used and 396 grams of ethylene oxide (9 mols) are added to 400 grams (1 mol) of Polyamine N–400. After this reaction is completed, the autoclave is opened and 20 grams of sodium methylate are added. The autoclave is then flushed again with nitrogen and an additional 572 grams (13 mols) of ethylene oxide is added at 100° C. This reaction is highly exothermic. The reaction mass now contains 1 mol of N–400 and a total of 22 mols of reacted ethylene oxide.

*Example 1–$O_4$*

A portion of the reaction mass of Example 1–$O_3$ is transferred to another autoclave and an additional amount of EtO was added. The reaction mass now contains the ratio of 1 mol of N–400 to 40 mols of EtO.

*Example 1–$O_5$*

The addition of ethylene oxide to Example 1–$O_4$ is continued until a molar ratio of 1 mol of N–400 to 75 mols of EtO is reached.

*Example 1–$O_6$*

The addition of ethylene oxide to Example 1–$O_5$ is continued until a molar ratio of 1 mol of N–400 to 83 mols of EtO is reached.

*Example 1–$O_7$*

The addition of ethylene oxide to the Example 1–$O_6$ is continued until a molar ratio of 1 mol of N–400 to 105 mols of EtO is reached.

*Example 2–$O_1$*

400 grams of N–400 are charged into a conventional stainless steel autoclave. The temperature is raised to 120° C., the autoclave is flushed with nitrogen and sealed. Then 290 grams of propylene oxide (5 mols) are added slowly at 120° C. A sample is taken at this point and labeled 2–$O_1$. This sample contains 5 mols of PrO for each mol of N–400. It is a dark very viscous liquid at room temperature.

*Example 2–$O_2$*

The addition of propylene oxide to 2–$O_1$ is continued as follows: The autoclave is opened and 35 grams of sodium methylate are added. The autoclave is again purged with nitrogen and sealed. Propylene oxide is added carefully until an additional 290 grams have been reacted. A sample is taken at this point and labeled 2–$O_2$ This compound now contains 10 mols of propylene oxide for each mol of N–400.

*Example 2–$O_3$*

The oxypropylation of 2–$O_2$ is continued until an additional 638 grams of propylene oxide are reacted. A sample is taken at this point and labeled 2–$O_3$. 2–$O_3$ contains 21 mols of propylene oxide for each mol of N–400. At room temperature the product is a dark thick liquid.

This oxyalkylation is continued to produce examples 2–$O_4$, 2–$O_5$, 2–$O_6$, 2–$O_7$.

A summary of oxyalkylated products produced from N–400 is presented in the following Table II.

The Roman numerals (I), (II), and (III), beside the moles of oxide added indicate the order of oxide addition (I) first, (II) second and (III) third, etc.

TABLE II—OXYALKYLATED PRODUCTS

| Ex. | MOLES OF OXIDE/MOLE N-400 | | | | | | Physical properties |
|---|---|---|---|---|---|---|---|
| | EtO, moles | Wgt. (g.) | PrO, moles | Wgt. (g.) | BuO, moles | Wgt. (g.) | |
| 1-$O_1$ | 5 | 220 | | | | | Dark viscous liquid. |
| 1-$O_2$ | 9 | 396 | | | | | Do. |
| 1-$O_3$ | 22 | 968 | | | | | Semi-solid. |
| 1-$O_4$ | 40 | 1,760 | | | | | Solid. |
| 1-$O_5$ | 75 | 3,300 | | | | | Do. |
| 1-$O_6$ | 83 | 3,652 | | | | | Do. |
| 1-$O_7$ | 105 | 4,620 | | | | | Do. |
| 2-$O_1$ | | | 5 | 290 | | | Dark viscous liquid. |
| 2-$O_2$ | | | 10 | 580 | | | Do. |
| 2-$O_3$ | | | 21 | 1,218 | | | Do. |
| 2-$O_4$ | | | 43 | 2,494 | | | Do. |
| 2-$O_5$ | | | 71 | 4,118 | | | Do. |
| 2-$O_6$ | | | 84 | 4,872 | | | Do. |
| 2-$O_7$ | | | 110 | 6,380 | | | Do. |
| 3-$O_1$ | | | | | 5 | 360 | Do. |
| 3-$O_2$ | | | | | 10 | 720 | Do. |
| 3-$O_3$ | | | | | 38 | 2,736 | Do. |
| 4-$O_1$ | 5(I) | 220 | 40(II) | 2,320 | | | Do. |
| 4-$O_2$ | 11(I) | 484 | 63(II) | 3,654 | | | Do. |
| 4-$O_3$ | 17(I) | 748 | 88(II) | 3,872 | | | Do. |
| 4-$O_4$ | 53(I) | 2,332 | 19(II) | 1,102 | | | Semi-solid. |
| 4-$O_5$ | 98(I) | 4,312 | 95(II) | 4,510 | | | Dark thick liquid. |
| 5-$O_1$ | 8(II) | 352 | 19(I) | 1,102 | | | Do. |
| 5-$O_2$ | 22(II) | 968 | 39(I) | 2,262 | | | Do. |
| 5-$O_3$ | 18(II) | 792 | 96(I) | 5,568 | | | Do. |
| 5-$O_4$ | 95(II) | 4,080 | 105(I) | 6,090 | | | Do. |
| 5-$O_5$ | 55(II) | 2,420 | 5(I) | 290 | | | Solid. |

TABLE II—Continued

| Ex. | MOLES OF OXIDE/MOLE N-400 | | | | | | Physical properties |
|---|---|---|---|---|---|---|---|
| | EtO, moles | Wgt. (g.) | PrO, moles | Wgt. (g.) | BuO, moles | Wgt. (g.) | |
| 6-O₁ | 5(III) | 220 | 18(II) | 1,044 | 5(I) | 360 | Dark viscous liquid. |
| 6-O₂ | 5(II) | 220 | 5(III) | 290 | 25(I) | 1,800 | Do. |
| 6-O₃ | 9(I) | 396 | 23(III) | 1,334 | 12(II) | 864 | Do. |
| 6-O₄ | 19(III) | 836 | 19(II) | 1,102 | 39(I) | 2,808 | Do. |
| 6-O₅ | 45(III) | 1,980 | 75(I) | 4,350 | 10(II) | 720 | Do. |
| 7-O₁ | Octylene oxide, 5 moles, 635 g. | | | | | | Do. |
| 7-O₂ | Octylene oxide, 8 moles, 1016 g. | | | | | | Do. |
| 8-O₁ | Styrene oxide, 4 moles, 480 g. | | | | | | Do. |
| 8-O₂ | Styrene oxide, 7 moles, 840 g. | | | | | | Do. |
| 9-O₁ | Epoxide 201, 1 mole, 280 g. | | | | | | Solid. |

The following table presents specific illustration of compounds other than N-400 and its derivatives.

TABLE II-A.—OXYALKYLATED PRODUCTS

| Example | Branched polyamine | Mols of oxide per mol of branched polyamine | | | Physical properties |
|---|---|---|---|---|---|
| | | EtO | PrO | BuO | |
| 10-O₁ | N-800 | 1 | | | Dark viscous liquid. |
| 10-O₂ | N-800 | 4 | | | Do. |
| 10-O₃ | N-800 | 10 | | | Do. |
| 10-O₄ | N-800 | 20 | | | Solid. |
| 10-O₅ | N-800 | 45 | | | Do. |
| 10-O₆ | N-800 | 90 | | | Do. |
| 10-O₇ | N-800 | 125 | | | Do. |
| 11-O₁ | N-800 | | 1 | | Dark viscous liquid. |
| 11-O₂ | N-800 | | 3 | | Do. |
| 11-O₃ | N-800 | | 9 | | Do. |
| 11-O₄ | N-800 | | 25 | | Do. |
| 11-O₅ | N-800 | | 75 | | Do. |
| 11-O₆ | N-800 | | 125 | | Do. |
| 11-O₇ | N-800 | | 240 | | Do. |
| 12-O₁ | N-800 | | | 3 | Do. |
| 12-O₂ | N-800 | | | 7 | Do. |
| 12-O₃ | N-800 | | | 20 | Do. |
| 12-O₄ | N-800 | | | 40 | Do. |
| 12-O₅ | N-800 | | | 80 | Do. |
| 13-O₁ | N-800 | 5(I) | 40(II) | | Do. |
| 13-O₂ | N-800 | 10(II) | 80(I) | | Do. |
| 14-O₁ | N-800 | 10(I) | | 10(II) | Viscous liquid. |
| 14-O₂ | N-800 | 5(II) | | 15(I) | Do. |
| 15-O₁ | N-800 | | 2(I) | 1(II) | Do. |
| 15-O₂ | N-800 | | 6(II) | 4(I) | Do. |
| 16-O₁ | N-800 | 1(III) | 2(II) | 3(I) | Do. |
| 16-O₂ | N-800 | 8(III) | 60(I) | 4(II) | Do. |
| 16-O₃ | N-800 | 20(II) | 40(III) | 12(I) | Do. |
| 16-O₄ | N-800 | 6(II) | 4(I) | 18(III) | Do. |
| 16-O₅ | N-800 | 10(I) | 20(II) | 5(III) | Do. |
| 16-O₆ | N-800 | 5(I) | 5(III) | 5(II) | Do. |
| 17-O | N-800 | Octylene oxide, 5 mols | | | Do. |
| 18-O | N-800 | Styrene oxide, 10 mols | | | Do. |
| 19-O | N-800 | Epoxide 201, 2 mols | | | Do. |
| 20-O₁ | N-1200 | 5 | | | Do. |
| 20-O₂ | N-1200 | 10 | | | Do. |
| 20-O₃ | N-1200 | 20 | | | Do. |
| 20-O₄ | N-1200 | 40 | | | Do. |
| 20-O₅ | N-1200 | 80 | | | Do. |
| 21-O₁ | N-1200 | | 5 | | Do. |
| 21-O₂ | N-1200 | | 10 | | Do. |
| 21-O₃ | N-1200 | | 20 | | Do. |
| 21-O₄ | N-1200 | | 40 | | Do. |
| 21-O₅ | N-1200 | | 80 | | Do. |
| 21-O₆ | N-1200 | | 160 | | Do. |
| 22-O₁ | N-1200 | 10(I) | 10(II) | | Do. |
| 22-O₂ | N-1200 | 5(II) | 45(I) | | Do. |
| 23-O₁ | N-1200 | | 2(I) | 2(II) | Do. |
| 23-O₂ | N-1200 | | 15(II) | 3(I) | Do. |
| 24-O₁ | N-1200 | 3(I) | | 10(II) | Do. |
| 24-O₂ | N-1200 | 12(II) | | 25(I) | Do. |
| 25-O₁ | N-1200 | 8(I) | 12(II) | 2(III) | Do. |
| 25-O₂ | N-1200 | 19(I) | 5(III) | 8(II) | Do. |
| 25-O₃ | N-1200 | 26(II) | 80(III) | 10(I) | Do. |
| 25-O₄ | N-1200 | 40(II) | 120(I) | 20(III) | Do. |
| 25-O₅ | N-1200 | 1(III) | 1(II) | 1(I) | Do. |
| 25-O₆ | N-1200 | 5(III) | 4(I) | 2(II) | Do. |
| 26-O₁ | N-1200 | Styrene oxide, 5 mols | | | Solid. |
| 26-O₂ | N-1200 | Octylene oxide, 10 mols | | | Do. |

ACYLATION THEN OXYALKYLATION

Prior acylated branched polyamines can be oxyalkylated in the above manner by starting with the acylated branched polyamine instead of the unreacted amine. Non-limiting examples are presented in the following tables. The symbol employed to designate an acylated, oxyalkylated branched polyamine is "AO." Specifically "1-$A_4O_1$" represents acylated, then oxyalkylated polyamine N-400.

Example 3-$A_3O_3$

For this example an autoclave equipped to handle alkylene oxides is necessary. 1156 grams (1 mole) of 3-$A_3$ (N-400+3 moles oleic acid minus three moles $H_2O$) are charged into the autoclave. Following a nitrogen purge and the addition of 120 grams of sodium methylate, the temperature is raised to 135° C. and 5683 grams of EtO (98 mols) are added. At the completion of this reaction, 2024 grams of PrO (46 moles) are added and the reaction allowed to go to completion. The resulting polymer is a dark viscous fluid soluble in an aromatic solvent.

Example 5-$A_1O_3$

For this example a conventional autoclave equipped to handle alkylene oxides is necessary. 946 grams of 5-$A_1$ (N-400+3 moles lauric acid minus 3 moles $H_2O$) are charged into the autoclave. The charge is catalyzed with 100 grams of sodium methylate, purged with nitrogen and heated to 150° C. 480 grams (4 moles) of styrene oxide are added and reacted for 24 hours with agitation. The resulting product is a dark extremely viscous fluid.

Example 7-$A_1O_1$

For this example a conventional autoclave equipped to handle alkylene oxides is necessary. 1314 grams of 7-$A_2$ (N-400+4 moles palmitic acid minus 6.2 moles $H_2O$) are charged into the autoclave. Following the addition of 120 grams of sodium methylate and a nitrogen purge, the mass is heated to 135° C. 660 grams of EtO (15 moles) are added and the reaction proceeded to completion. Then 1440 grams of BuO (20 moles) are added and again the reaction proceeded to completion. The resulting polymer is a dark viscous fluid soluble in an aromatic solvent.

These reactions are summarized in the following table:

TABLE III.—ACYLATED, OXYALKYLATED N-400

| Ex. | Moles of Oxide/Mole of reactant | | | | | | Physical properties |
|---|---|---|---|---|---|---|---|
| | EtO, moles | Wgt. (g.) | PrO, moles | Wgt. (g.) | BuO, moles | Wgt. (g.) | |
| 1-$A_1O_1$ | 42 (II) | 1,048 | 78 (I) | 4,524 | | | Dark, viscous liquid. |
| 1-$A_1O_2$ | 8 (II) | 352 | 59 (I) | 3,422 | | | Do. |
| 1-$A_1O_3$ | 8 (III) | 352 | 18 (II) | 1,044 | 15 (I) | 1,080 | Do. |
| 1-$A_1O_4$ | 23 (III) | 1,018 | 47 (I) | 2,726 | 10 (II) | 720 | Do. |
| 3-$A_3O_1$ | 12 (I) | 528 | 22 (II) | 1,276 | | | Solid. |
| 3-$A_3O_2$ | 12 (II) | 528 | 29 (I) | 1,682 | | | Dark, thick liquid. |
| 3-$A_3O_3$ | 46 (II) | 2,024 | 98 (I) | 5,683 | | | Do. |
| 4-$A_1O_1$ | 4 | 176 | | | | | Solid. |
| 4-$A_1O_2$ | | | 5 | 290 | | | Do. |
| 4-$A_1O_3$ | 3 (I) | 132 | 3 (II) | 174 | | | Do. |
| 5-$A_1O_1$ | | | | | 6 | 432 | Do. |
| 5-$A_1O_2$ | | | 2 (I) | 116 | 3 (II) | 216 | Do. |
| 5-$A_1O_3$ | Styrene oxide 4 moles, 480 grams | | | | | | Dark, viscous liquid. |
| 5-$A_1O_4$ | Octylene oxide 5 moles, 635 grams | | | | | | Do. |
| 7-$A_1O_1$ | 15 (I) | 660 | | | 20 (II) | 1,440 | Dark, thick liquid. |
| 7-$A_1O_2$ | 10 (II) | 440 | 30 (I) | 1,740 | | | Do. |
| 7-$A_1O_3$ | 109 (II) | 4,796 | 210 (I) | 12,180 | | | Do. |
| 9-$A_3O_1$ | 23 (I) | 1,018 | 18 (II) | 1,044 | 3 (III) | 216 | Do. |
| 9-$A_3O_2$ | 23 (I) | 1,018 | 26 (II) | 1,508 | | | Do. |
| 9-$A_3O_3$ | 36 (II) | 1,584 | 78 (I) | 4,524 | | | Do. |
| 11-$A_1O_1$ | 32 (I) | 1,408 | 23 (II) | 1,334 | | | Solid. |
| 11-$A_1O_2$ | 13 (I) | 572 | 49 (II) | 2,842 | | | Do. |

The following table presents specific illustration of compounds other than N-400 and its derivatives.

TABLE III-A.—ACYLATED, OXYALKYLATED BRANCHED POLYAMINES

| Example | Mols of oxide per mol of reactant | | | Physical properties |
|---|---|---|---|---|
| | EtO | PrO | BuO | |
| 18-$A_2O_1$ | 5 | | | Dark, viscous liquid. |
| 18-$A_2O_2$ | 10 (II) | 60 (I) | | Do. |
| 18-$A_2O_3$ | | 2 | | Do. |
| 18-$A_2O_4$ | 5 (III) | 40 (II) | 10 (I) | Do. |
| 18-$A_2O_5$ | Styrene oxide, 4 mols | | | |
| 22-$A_1O_1$ | 3 (I) | | 15 (II) | Do. |
| 25-$A_1O_2$ | | 12 (II) | 2 (I) | Do. |
| 25-$A_1O_3$ | Octylene oxide, 5 mols | | | Do. |
| 26-$A_1O_1$ | 10 (I) | 80 (II) | 10 (III) | Do. |
| 26-$A_1O_2$ | 2 (I) | 2 (II) | | Do. |
| 26-$A_1O_3$ | | | 4 | Do. |
| 27-$A_1O_1$ | 3 (II) | 8 (I) | 1 (III) | Do. |
| 27-$A_1O_2$ | 15 | | | Do. |
| 27-$A_1O_3$ | | 3 | | Do. |
| 27-$A_1O_4$ | | | 8 | Do. |
| 28-$A_1O_1$ | 60 (II) | 5 (III) | 26 (I) | Do. |
| 31-$A_1O_1$ | 1 | | | Do. |
| 31-$A_1O_2$ | 5 | | | Do. |
| 31-$A_1O_3$ | | 3 | | Do. |
| 31-$A_1O_4$ | Epoxide 201, 1 mol | | | Do. |
| 33-$A_1O_1$ | Styrene oxide, 10 mols | | | Do. |

OXYALKYLATION THEN ACYLATION

The prior oxyalkylated branched polyamines can be acylated with any of the acylation agents herein disclosed (in contrast to acylation prior to oxyalkylation). Since these reactants also have hydroxy group acylation, in addition to reaction with the amino groups noted above, also includes esterification.

The method of acylation in this instance is similar to that carried out with the polyamine itself, i.e., dehydration wherein the removal of water is a test of the completion of the reaction.

Example 1-$O_1A$

One mole of 1-$O_1$ (620 grams) is mixed with three moles of acetic acid (180 grams) and 400 ml. of xylene at room temperature. The temperature is raised slowly to 120–130° C. and refluxed gently for one hour. The temperature is then raised to 150–160° C. and heated until 3 moles of water and all of the xylene are stripped off. The dark product is water-soluble.

Example 2-$O_4A$

One mole of 2-$O_4$ (2894 grams) is mixed with one mole of palmitic acid (256 grams) at room temperature. Vacuum is applied and the temperature is raised slowly until one mole of water (18 grams) is removed. This product is a dark viscous liquid.

Example 6-$O_5A$

One mole of 6-$O_5$ (7450 grams) is mixed with 500 grams of xylene and heated to 100° C. One mole of diglycolic acid (134 grams) is added slowly to prevent excessive foaming. The temperature is raised to 140–150° C. and held until one mole of water has envolved. This product is the diglycolic acid fractional ester of 6-$O_5$. A white precipitate forms during this reaction which can be removed by filtration. Analysis shows the precipitate to be sodium acid diglycollate, a reaction product of the catalyst and diglycolic acid. The filtered product is a dark viscous liquid at room temperature.

Table IV contains examples which further illustrate the invention. The symbol employed to designate oxyalkylated, acylated products is "OA."

TABLE IV.—OXYALKYLATED, THEN ACYLATED BRANCHED POLYAMINE N-400

| Ex. | Acylating agent | | | Water removed | | Physical properties |
|---|---|---|---|---|---|---|
| | Name | Moles of acylating agent | Wgt., grams | Moles | Wgt. (g.) | |
| 1-$O_1A$ | Acetic | 3 | 180 | 3 | 54 | Dark liquid. |
| 1-$O_1A$ | Oleic | 1 | 282 | 1 | 18 | Do. |
| 1-$O_3A$ | Stearic | 2 | 568 | 2 | 36 | Solid. |
| 2-$O_1A$ | Lauric | 1 | 200 | 1 | 18 | Dark liquid. |
| 2-$O_3A$ | Myristic | 2 | 457 | 2 | 36 | Do. |
| 2-$O_4A$ | Palmitic | 1 | 256.4 | 1 | 18 | Do. |
| 4-$O_1A$ | Oleic | 2 | 564 | 2 | 36 | Solid. |
| 4-$O_3A$ | Ricinoleic | 1 | 298.5 | 1 | 18 | Dark liquid. |
| 5-$O_1A$ | Abietic acid | 1 | 302.4 | 1 | 18 | Dark solid. |
| 5-$O_3A$ | Tall oil | 1 | 175 | 1 | 18 | Dark liquid. |
| 6-$O_2A$ | Linoleic | 1 | 280.4 | 1 | 18 | Do. |
| 6-$O_3A$ | Oleic | 2 | 564 | 2 | 36 | Do. |
| 6-$O_3A$ | Maleic anhydride | 1 | 98 | 1 | 18 | Viscous liquid. |
| 6-$O_5A$ | Diglycolic | 1 | 134 | 1 | 18 | Do. |
| 7-$O_1A$ | Lauric | 2 | 400 | 2 | 36 | Dark liquid. |
| 8-$O_1A$ | Stearic | 1 | 284 | 1 | 18 | Solid. |

The following table presents specific illustration of compounds other than N-400 and its derivatives.

TABLE IV-A.—OXYALKYLATED, THEN ACYLATED BRANCHED POLYAMINE

| Example | Name | Mols of acylating agent | Wt. in grams | Water removed | | Physical properties |
|---|---|---|---|---|---|---|
| | | | | Mols | Wt. in grams | |
| 10-$O_3A$ | Stearic | 1 | 284 | 1 | 18 | Solid. |
| 11-$O_2A$ | Lauric | 2 | 400 | 2 | 36 | Viscous liquid. |
| 11-$O_5A$ | Diglycolic | 1 | 134 | 1 | 18 | Dark liquid. |
| 12-$O_1A$ | Maleic anhydride | 1 | 98 | | | Viscous liquid. |
| 13-$O_1A$ | Oleic | 2 | 564 | 1 | 18 | Do. |
| 14-$O_2A$ | Linoleic | 1 | 280.4 | 1 | 18 | Do. |
| 15-$O_1A$ | Tall oil | 1 | 175 | 1 | 18 | Do. |
| 16-$O_3A$ | Abietic acid | 1 | 302 | 1 | 18 | Solid. |
| 17-OA | Ricinoleic | 1 | 298 | 1 | 18 | Viscous liquid. |
| 18-OA | Oleic | 2 | 564 | 2 | 36 | Do. |
| 20-$O_1A$ | Palmitic | 1 | 256 | 1 | 18 | Solid. |
| 20-$O_3A$ | Myristic | 2 | 457 | 2 | 36 | Do. |
| 21-$O_1A$ | Lauric | 1 | 200 | 1 | 18 | Do. |
| 21-$O_6A$ | Stearic | 2 | 568 | 2 | 36 | Do. |
| 22-$O_2A$ | Oleic | 1 | 282 | 1 | 18 | Viscous liquid. |
| 23-$O_2A$ | Acetic | 1 | 60 | 1 | 18 | Do. |
| 24-$O_2A$ | Diphenolic | 1 | 286 | 1 | 18 | Do. |
| 25-$O_1A$ | Terephthalic | 1 | 166 | 1 | 18 | Solid. |
| 25-$O_4A$ | Naphthenic | 2 | 330 | 2 | 36 | Viscous liquid. |
| 25-$O_6A$ | do | 1 | 330 | 1.9 | 34 | Do. |
| 26-$O_1A$ | Benzoic | 1 | 122 | 1 | 18 | Do. |
| 26-$O_2A$ | Lauric | 1 | 200 | 1.8 | 32 | Do. |

HEAT TREATMENT OF OXYALKYLATED PRODUCTS

The oxyalkylated products described herein, for example, those shown in Table II relating to oxyalkylated branched polyamines and those in Table III relating to oxyalkylated, prior acylated, branched polyamines can be heat treated to form useful compositions.

In general, the heat treatment is carried out at 200–250° C. Under dehydrating conditions, where reduced pressure and a fast flow of nitrogen is used, lower temperatures can be employed, for example 150–200° C.

Water is removed during the reaction, such as by means of a side trap. Nitrogen passing through the reaction mixture and/or reduced pressure can be used to facilitate water removal.

The exact compositions cannot be depicted by the usual chemical formulas for the reason that the structures are subject to a wide variation.

The heat treatment is believed to result in the polymerization of these compounds and is effected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats, calcium chloride, iron and the like. The proportion of catalyst employed may vary from slightly les sthan 0.1%, in some instances, to over 1% in other instances.

Conditions must be such as to permit the removal of water formed during the process. At times the process can be conducted most readily by permitting part of the volatile constituents to distill, and subsequently subjecting the vapors to condensation. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distill in such a manner as to remove the water of reaction. In any event, the speed of reaction and the character of the polymerized product depend not only upon the original reactants themselves, but also on the nature and amount of catalyst employed, on the temperature employed, the time of reaction, and the speed of water removal, i.e., the effectiveness with which the water of reaction is removed from the combining mass. Polymerization can be effected without the use of catalysts in some instances, but such procedure is generally undesirable, due to the fact that the reaction takes a prolonged period of time, and usually a significantly higher temperature. The use of catalyst such as iron, etc. fosters the reaction.

The following examples are presented to illustrate heat treatment. The symbol used to designate a heat treated oxyalkylated polyamine is "OH" and an acylated, oxyalkylated product is "AOH." In all examples 500 grams of starting material and a temperature of 225–250° C. are employed.

Example 1-$O_3H$

A conventional glass resin vessel equipped with a stirrer and water trap is used. Five hundred grams of 1-$O_3$ are charged into the above resin vessel along with five grams of $CaCl_2$. The temperature is raised to 225–250° C. and heated until 50 grams of water (2.8 mols) are evolved. This process takes 7.5 hours of heating. The product is an extremely viscous material at room temperature. However, upon warming slightly this product dissolves easily in water.

Example 2-$O_3H$

The process of the immediately previous example is repeated using 2-$O_3$ but substituting sodium methylate for calcium chloride. The product is a dark, viscous, water-soluble material.

Example 6-$O_1H$

The process of Example 1-$O_3H_1$ is repeated using 6-$O_1$ but substituting powdered iron for calcium chloride.

TABLE V.—HEAT TREATED (1) OXYALKYLATED AND (2) ACYLATED, OXYALKYLATED POLYAMINE N-400

| Ex. | Catalyst 5 grams | Water removed | | Time in hours |
|---|---|---|---|---|
| | | Wgt. | Moles | |
| 1-$O_3H$ | $CaCl_2$ | 50 | 2.8 | 7.5 |
| 1-$O_5H$ | Iron | 29 | 1.6 | 8.5 |
| 2-$O_3H$ | Sodium methylate | 58 | 3.2 | 7.5 |
| 2-$O_7H$ | do | 63 | 3.5 | 8.0 |
| 4-$O_2H$ | do | 56 | 3.1 | 9.3 |
| 4-$O_5H$ | $CaCl_2$ | 40 | 2.2 | 10.0 |
| 5-$O_2H$ | Iron | 31 | 1.7 | 7.5 |
| 6-$O_1H$ | do | 61 | 3.4 | 8.0 |
| 6-$O_2H$ | do | 33 | 1.8 | 6.8 |
| 1-$A_4O_3H$ | $CaCl_2$ | 63 | 3.5 | 8.0 |
| 3-$A_3O_1H$ | Sodium methylate | 47 | 2.6 | 8.5 |
| 7-$A_1O_2H$ | NaOH | 27 | 1.5 | 7.5 |
| 9-$A_3O_3H$ | CaOH | 50 | 2.8 | 8.0 |
| 11-$A_1O_1H$ | KOH | 54 | 3.0 | 8.5 |

NOTE.—All of the above products are dark, viscous liquids.

The following table presents specific illustration of compounds other than N-400 and its derivatives.

TABLE V-A.—HEAT TREATED (1) OXYLKYLATED AND (2) ACYLATED, OXYALKYLATED BRANCHED POLYAMINE

| Example | Catalyst (5 grams) | Wt. of water removed | Mols of H₂O removed | Time in hours |
|---|---|---|---|---|
| 10-O₁H | Iron | 31 | 1.7 | 7.5 |
| 11-O₁H | do | 61 | 3.4 | 8.0 |
| 12-O₁H | do | 33 | 1.8 | 6.8 |
| 13-O₁H | do | 63 | 3.5 | 8.0 |
| 14-O₁H | do | 47 | 2.6 | 8.5 |
| 15-O₁H | Sodium methylate | 27 | 1.5 | 7.5 |
| 16-O₁H | CaCl₂ | 50 | 2.8 | 8.0 |
| 20-O₁H | CaOH | 54 | 3.0 | 8.5 |
| 21-O₁H | Iron | 40 | 2.2 | 10.0 |
| 22-O₁H | do | 56 | 3.1 | 9.3 |
| 23-O₁H | do | 63 | 3.5 | 8.0 |
| 25-O₃H | do | 58 | 3.2 | 7.5 |
| 18-A₂O₁H | do | 29 | 1.6 | 8.5 |
| 18-A₂O₃H | do | 50 | 2.8 | 7.5 |
| 25-A₁O₂H | NaOH | 29 | 1.6 | 8.5 |
| 26-A₁O₂H | do | 63 | 3.5 | 8.0 |
| 27-A₁O₃H | do | 33 | 1.8 | 6.8 |
| 31-A₁O₁H | KOH | 27 | 1.5 | 7.5 |
| 33-A₁O₁H | do | 50 | 2.8 | 8.0 |

NOTE.—All of the above products are dark viscous liquids.

ALKYLATION

Alkylation relates to the reaction of the branched polyamine and derivatives thereof with alkylating agents.

Any hydrocarbon halide, e.g. alkyl, alkenyl, cycloalkenyl, aralkyl, etc., halide which contains at least one carbon atom and up to about thirty carbon atoms or more per molecule can be employed to alkylate the products of this invention. It is especially preferred to use alkyl halides having between about one to about eighteen carbon atoms per molecule. The halogen portion of the alkyl halide reactant molecule can be any halogen atom, i.e., chlorine, bromine, fluorine, and iodine. In practice, the alkyl bromides and chlorides are used, due to their greater commercial availability. Non-limiting examples of the alkyl halide reactant are methyl chloride; ethyl chloride; propyl chloride; n-butyl chloride; sec-butyl iodide; t-butyl fluoride; n-amyl bromide; isoamyl chloride; n-hexyl bromide; n-hexyl iodide; heptyl fluoride; 2-ethyl-hexyl chloride; n-octyl bromide; decyl iodide; dodecyl bromide; 7-ethyl-2-methyl-undecyl iodide; tetradecyl bromide; hexadecyl bromide; hexadecyl fluoride; heptadecyl chloride; octadecyl bromide; docosyl chloride; tetracosyl iodide; hexacosyl bromide; octacosyl chloride; and triacontyl chloride. In addition, alkenyl halides can also be employed, for example, the alkenyl halides corresponding to the above examples. In addition, the halide may contain other elements besides carbon and hydrogen as, for example, where dichloroethylether is employed.

The alkyl halides can be chemically pure compounds or of commercial purity. Mixtures of alkyl halides, having carbon chain lengths falling within the range specified hereinbefore, can also be used. Examples of such mixtures are mono-chlorinated wax and mono-chlorinated kerosene. Complete instructions for the preparation of mono-chlorowax have been set forth in United States Patent 2,238,790.

Since the reaction between the alkyl halide reactant and the branched polyamine is a condensation reaction, or an alkylation reaction, characterized by the elimination of hydrogen halide, the general conditions for such reactions are applicable herein. It is preferable to carry out the reaction at temperatures of between about 100° and about 250° C., preferably between about 140° C. and about 200° C., in the presence of a basic material which is capable of reacting with the hydrogen halide to remove it. Such basic materials are, for example, sodium bicarbonate, sodium carbonate, pyridine, tertiary alkyl amines, alkali or alkaline earth metal hydroxides, and the like.

It is preferred to perform the reaction between the alkyl halide reactant and the branched polyamine reactant in a hydrocarbon solvent under reflux conditions. The aromatic hydrocarbon solvents of the benzene series are especially preferable. Non-limiting examples of the preferred solvent are benzene, toluene, and xylene. The amount of solvent used is a variable and non-critical factor. It is dependent on the size of the reaction vessel and on the reaction temperature selected. For example, it will be apparent that the amount of solvent used can be so great that the reaction temperature is lowered thereby.

The time of reaction between the alkyl halide reactant and the branched polyamine is dependent on the weight of the charge, the reaction temperature selected, and the means employed for removing the hydrogen halide from the reaction mixture. In practice, the reaction is continued until no more hydrogen halide is formed. In general, the time of reaction will vary widely such as between about four and about ten hours.

It can be postulated that the reaction between the alkyl halide reactant and the branched polyamine results in the formation of products where the alkyl group of the alkyl halide has replaced a hydrogen atom attached to a nitrogen atom. It is also conceivable that alkylation of an alkylene group of the branched polyamine can occur. However, the exact composition of any given reaction product cannot be predicted. For example, when two moles of butyl bromide are reacted with one mole of Polyamine N–400, a mixture of mono-, di- and tri- and higher N-alkylated products can be produced. Likewise, the alkyle groups can be substituted on different nitrogen atoms in different molecules of the branched polyamine.

Thus, the term "Alkylation" as employed herein and in the claims includes alkenylation, cycloalkenylation, aralkylation, etc., and other hydrocarbonylation as well as alkylation itself.

In general, the following examples are prepared by reacting the alkyl halide with the branched polyamine at the desired ratio in the presence of one equivalent of base for each equivalent HCl given off during the reaction. Water formed during the reaction is removed by distillation. Where the presence of the anions, such as chlorine, bromine, etc., is not material and salts and quaternary compounds are desired, no base is added.

The following examples are presented to illustrate the alkylation of the branched polyamines.

Example 5–K₁

One mole of each of the following: tetradecylchloride, Polyamine N–400, and sodium bicarbonate are placed in a reaction vessel equipped with a mechanical stirrer, a thermometer and a condenser reflux take-off for removal of water from the reaction as it is evolved in an azeotropic mixture of water and a hydrocarbon solvent. The reflux take-off is filled with xylene. The stirred reactants are heated to about 80° C. whereupon an exothermic reaction causes the temperature to rise to about 130° C. The reaction temperature is then increased to 160° C. and held there for two hours. Then, xylene is added to the reaction vessel in an amount sufficient to cause a xylene reflux to take place at a temperature of 150–170° C. The reaction is continued for six hours or until the theoretical amount of water is removed. Thereupon, an equal volume of xylene is added to the reaction mixture and the resultant solution is filtered. This filtrate is then evaporated under reduced pressure to yield a dark amber oil. No halogen was present in this product as evidenced by a negative Beilstein copper wire test.

Example 5–K₁X

The above reaction is repeated except that no sodium bicarbonate is employed in the reaction. The reaction product contained chlorine.

The reactions shown in the following table are carried out in a similar manner. Each reaction in the table is carried out in two ways—(1) in the presence of base as in 5–K₁ to yield the halogen-free alkylation product Table VI and (2) in the absence of base to yield halogen containing products in the manner of 5K₁X Table VII.

The alkylated products of this invention contain primary, secondary, tertiary, and quaternary amino groups. By controlling the amount of alkylation agent employed and the conditions of reaction, etc., one can control the type and amount of alkylation. For example, by reaction less than the stoichiometric amount of alkylation agent one could preserve the presence of nitrogen-bonded hydrogen present on the molecule and by exhaustive alkylation in the presence of sufficient basic material, one can form more highly alkylated compounds.

The moles of alkylating agent reacted with the branched polyamine will depend on the number of alkylation reactive positions contained therein as well as the number of moles of alkylating agent one wishes to incorporate into the molecule. Theoretically every hydrogen bonded to a nitrogen atom can be alkylated. We have advantageously reacted 1–10 moles of alkylating agent per moles of Polyamine N–400, but preferably 1–6 moles. With Polyamine N–800 and N–1200, twice and three times as many moles of alkylating agent can be employed respectively, i.e., with Polyamine N–800, 1–20 moles, preferably 1–12; with Polyamine N–1200, 1–30 but preferably 1–18. Optimum alkylation will depend on the particular application.

In addition, the alkyl halide may contain functional groups. For example chloroacetic acid can be reacted with the branched polyamines to yield a compound containing carboxylic acid groups $$PN—CH_2COOH$$

wherein P is the residue of the polyamine.

In addition, the branched polyamine can be alkylated with an alkyl halide such as alkyl chloride and then reacted with chloroacetic acid to yield an alkylated polyamine containing carboxylic acid groups.

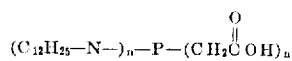

The symbol employed to designate an alkylated polyamine is "K." Where the product is a salt or a quaternary the symbol is "KX."

TABLE VI.—ALKYLATED PRODUCTS

| Ex. | Alkylating agent | Ratio, moles of Alkylating agent/ mole of polyamine 400 or derivatives | Physical properties |
|---|---|---|---|
| 1-K₁ | Butyl chloride | 1:1 | Viscous liquid. |
| 1-K₂ | do | 3:1 | Do. |
| 1-K₃ | do | 5:1 | Do. |
| 2-K₁ | N-amyl bromide | 2:1 | Do. |
| 2-K₂ | do | 4:1 | Do. |
| 2-K₃ | do | 6:1 | Do. |
| 3-K₁ | 2-ethyl-hexyl chloride | 3:1 | Do. |
| 3-K₂ | do | 5:1 | Do. |
| 3-K₃ | do | 7:1 | Do. |
| 4-K₁ | Dodecyl chloride | 2:1 | Semisolid. |
| 4-K₂ | do | 3:1 | Do. |
| 4-K₃ | do | 5:1 | Solid. |
| 5-K₁ | Tetradecyl chloride | 1:1 | Semisolid. |
| 5-K₂ | do | 3:1 | Solid. |
| 5-K₃ | do | 6:1 | Do. |
| 6-K₁ | Octadecyl chloride | 1:1 | Semisolid. |
| 6-K₂ | do | 3:1 | Solid. |
| 6-K₃ | do | 4:1 | Do. |
| 7-K₁ | Benzyl chloride | 1:1 | Viscous liquid. |
| 7-K₂ | do | 5:1 | Solid. |
| 7-K₃ | do | 3:1 | Do. |
| 8-K₁ | Allyl chloride | 3:1 | Viscous liquid. |
| 8-K₂ | do | 4:1 | Do. |
| 8-K₃ | do | 6:1 | Do. |
| 9-K₁ | Dodecenyl chloride | 1:1 | Viscous liquid. |
| 9-K₂ | do | 3:1 | Semisolid. |
| 9-K₃ | do | 5:1 | Do. |
| 10-K₁ | Dodecylbenzyl chloride. | 2:1 | Solid. |
| 10-K₂ | do | 4:1 | Do. |
| 10-K₃ | do | 5:1 | Do. |
| 11-K₁ | 1,4-dichlorobutene-2 | 1:2 | Viscous liquid. |
| 11-K₂ | do | 2:1 | Do. |
| 11-K₃ | do | 3:1 | Do. |
| 12-K₁ | 1,4-xylylene dichloride | 1:2 | Viscous liquid. |
| 12-K₂ | do | 3:1 | Do. |
| 12-K₃ | do | 5:1 | Do. |
| 13-K₁ | Dichlorodiethylether | 1:1 | Do. |
| 13-K₂ | do | 3:1 | Do. |
| 1-O₃K | do | 5:1 | Semisolid. |
| 2-O₂K | Benzylchloride | 8:1 | Solid. |
| 3-A₃K | Methyl chloride | 6:1 | Liquid. |
| 5-A₁K | Dimethylsulfate | 4:1 | Do. |
| 2-O₁AK | Ethylene dichloride | 2:1 | Viscous liquid. |
| 5-O₁AK | 1,4-dichlorobutene-2 | 4:1 | Do. |
| 1-A₄O₂K | Dodecyl chloride | 3:1 | Semisolid. |
| 7-A₁O₁K | n-Amylbromide | 4:1 | Viscous liquid. |
| 4-O₂HK | 1,4-xylylene dichloride | 3:1 | Do. |
| 6-O₁HK | Methyl chloride | 6:1 | Liquid. |
| 7-A₁O₂HK | Dichlorodiethylether | 4:1 | Viscous liquid. |
| 11-A₁O₁HK | do | 4:1 | Do. |

The following tables present specific illustration of compounds other than N–400 and its derivatives.

TABLE VI-A.—ALKYATED PRODUCTS

| Example | Branched polyamine | Alkylating agent | Ratio mols of alkylating agent per mol of branched polyamine or derivatives | Physical properties |
|---|---|---|---|---|
| 14-K₁ | N-800 | Benzyl chloride | 2:1 | Viscous liquid. |
| 14-K₂ | N-800 | do | 3:1 | Do. |
| 14-K₃ | N-800 | do | 5:1 | Do |
| 15-K₁ | N-800 | Dichlorodiethylether | 1:1 | Semisolid. |
| 15-K₂ | N-800 | do | 3:1 | Do |
| 16-K₁ | N-1200 | Allyl chloride | 1:1 | Viscous liquid. |
| 16-K₂ | N-1200 | do | 2:1 | Do. |
| 16-K₃ | N-1200 | do | 3:1 | Do. |
| 17-K₁ | N-1200 | Butyl chloride | 1:1 | Do. |
| 17-K₂ | N-1200 | do | 3:1 | Do. |
| 17-K₃ | N-1200 | do | 5:1 | Do. |
| 18-A₂K | N-1200 | Methyl chloride | 6:1 | Do. |
| 31-A₁K | N-1200 | n-Amyl bromide | 3:1 | Do. |
| 10-O₃K | N-1200 | Dodecenyl chloride | 1:1 | Do. |
| 11-O₄K | N-1200 | Dimethyl sulfate | 2:1 | Do. |
| 25-O₄K | N-1200 | Dichlorodiethylether | 1:1 | Do. |
| 26-A₁O₂K | N-1200 | Allyl chloride | 2:1 | Do. |
| 33-A₁O₁K | N-1200 | Octadecyl chloride | 3:1 | Do. |
| 11-O₂AK | N-1200 | n-Amyl bromide | 1:1 | Do. |
| 18-OAK | N-1200 | Benzyl chloride | 2:1 | Do. |
| 14-O₂HK | N-1200 | Dichloropentane | 1:1 | Do. |
| 25-A₁O₂HK | N-1200 | Methyl chloride | 1:1 | Do. |

TABLE VII.—SALT AND QUATERNARY PRODUCTS OF ALKYLATED N-400 AND DERIVATIVES

| Ex. | Alkylating agent | Ratio, moles of alkylating agent of polyamine N-400 or derivative | Physical properties |
|---|---|---|---|
| 1-K₁X | Butyl chloride | 1:1 | Viscous liquid. |
| 1-K₂X | do | 3:1 | Do. |
| 1-K₃X | do | 5:1 | Do. |
| 2-K₁X | n-Amyl bromide | 2:1 | Do. |
| 2-K₂X | do | 4:1 | Do. |
| 2-K₃X | do | 6:1 | Do. |
| 3-K₁X | 2-ethyl-hexyl chloride. | 3:1 | Do. |
| 3-K₂X | do | 5:1 | Do. |
| 3-K₃X | do | 7:1 | Do. |
| 4-K₁X | Dodecyl chloride | 2:1 | Semisolid. |
| 4-K₂X | do | 3:1 | Solid. |
| 4-K₃X | do | 5:1 | Do. |
| 5-K₁X | Tetradecyl chloride | 1:1 | Semisolid. |
| 5-K₂X | do | 3:1 | Solid. |
| 5-K₃X | do | 6:1 | Do. |
| 6-K₁X | Octadecyl chloride | 1:1 | Do. |
| 6-K₂X | do | 3:1 | Do. |
| 6-K₃X | do | 4:1 | Do. |
| 7-K₁X | Benzyl chloride | 1:1 | Semisolid. |
| 7-K₂X | do | 5:1 | Do. |
| 7-K₃X | do | 3:1 | Do. |
| 8-K₁X | Allyl chloride | 3:1 | Viscous liquid. |
| 8-K₂X | do | 4:1 | Do. |
| 8-K₃X | do | 6:1 | Do. |
| 9-K₁X | Dodecenyl chloride | 1:1 | Semisolid. |
| 9-K₂X | do | 3:1 | Solid. |
| 9-K₃X | do | 5:1 | Do. |
| 10-K₁X | Dodecylbenzyl chloride. | 2:1 | Do. |
| 10-K₂X | do | 4:1 | Do. |
| 10-K₃X | do | 5:1 | Do. |
| 11-K₁X | 1,4-dichlorobutene-2 | 1:2 | Viscous liquid. |
| 11-K₂X | do | 2:1 | Do. |
| 11-K₃X | do | 3:1 | Do. |
| 12-K₁X | 1,4-xylylene dichloride. | 1:2 | Do. |
| 12-K₂X | do | 3:1 | Do. |
| 12-K₃X | do | 5:1 | Do. |
| 13-K₁X | Dichlorodiethylether. | 1:1 | Do. |
| 13-K₂X | do | 3:1 | Semisolid. |
| 1-O₁KX | Dichlorodiethylether. | 5:1 | Solid. |
| 2-O₁KX | Benzylchloride | 8:1 | Do. |
| 3-A₁KX | Methyl chloride | 6:1 | Liquid. |
| 5-A₁KX | Dimethylsulfate | 4:1 | Viscous liquid. |
| 2-O₁AKX | Ethylene dichloride | 2:1 | Do. |
| 5-O₁AKX | 1,4-dichlorbutene-2 | 4:1 | Do. |
| 1-A₁O₂KX | Dodecyl chloride | 3:1 | Semisolid. |
| 7-A₁O₁KX | n-Amylbromide | 4:1 | Viscous liquid. |
| 4-O₂HKX | 1,4-xylylene dichloride. | 3:1 | Do. |
| 6-O₂HKX | Methyl chloride | 6:1 | Do. |
| 7-A₁O₂HKX | Dichlorodiethylether. | 4:1 | Semisolid. |
| 11-A₁O₁HKX | do | 4:1 | Do. |

The following table presents specific illustration of compounds other than N-400 and its derivatives.

TABLE VII-A.—SALT AND QUATERNARY PRODUCTS OF ALKYLATED BRANCHED POLYAMINE AND DERIVATIVES

| Example | Alkylating agent | Ratio of alkylating agent of polyamine or derivative | Physical properties |
|---|---|---|---|
| 14-K₁X | Ethylene dichloride | 2:1 | Solid |
| 14-K₂X | n-Amyl bromide | 3:1 | Do. |
| 14-K₃X | Dichlorodiethylether | 4:1 | Do. |
| 15-K₁X | Dimethyl sulfate | 3:1 | Do. |
| 15-K₂X | Methyl chloride | 2:1 | Do. |
| 16-K₁X | 1,4-xylene dichloride | 5:1 | Do. |
| 16-K₂X | Dodecylbenzyl chloride | 8:1 | Semisolid |
| 16-K₃X | 1,4-dichlorobutene-2 | 3:1 | Do. |
| 17-K₁X | Benzyl chloride | 4:1 | Do. |
| 17-K₂X | Methyl chloride | 3:1 | Do. |
| 17-K₃X | Ethylene dichloride | 2:1 | Do. |
| 18-A₂KX | Dodecyl chloride | 1:1 | Do. |
| 31-A₁KX | Dichlorodiethylether | 1:1 | Solid |
| 10-O₃KX | Benzyl chloride | 3:1 | Do. |
| 11-O₁KX | do | 2:1 | Do. |
| 25-O₄KX | do | 1:1 | Do. |
| 26-A₁O₂KX | Methyl chloride | 5:1 | Do. |
| 33-A₁O₁KX | do | 4:1 | Do. |
| 11-O₂AKX | do | 3:1 | Do. |
| 18-OAKX | Dichlorodiethylether | 3:1 | Do. |
| 14-O₂HKX | do | 2:1 | Do. |
| 25-A₁O₂HKX | do | 1:1 | Do. |

ALKYLATED THEN ACYLATION

The alkylated material prepared above can be further treated with acylating agent where residual acylatable amino groups are still present on the molecule. The acylation procedure is essentially that described above wherein carboxylic acids react with the alkylated polyamine under dehydrating conditions to form amides and cyclic amidines. The product depends on the ratio of moles of water removed for each carboxylic acid group, i.e., 1 mole water/1 mole carboxylic essentially amides; more than 1 mole water/1 mole carboxylic acid group, essentially cyclic amidines, such as imidazolines.

Such compounds are illustrated in the following table. The symbol employed to designated alkylated acylated products is "KA" and acylated, alkylated, acylated products is "AKA."

TABLE VIII.—ACYLATED, PRIOR ALKYLATED BRANCHED POLYAMINES

| Ex. | Acylating agent | Moles of acylating agent/mole of N-400 or derivative | Wgt. | Moles water removed | Physical properties |
|---|---|---|---|---|---|
| 1-K₁A | Oleic | 2 | 564 | 3.1 | Viscous liquid. |
| 2-K₂A | Stearic | 3 | 852 | 3.0 | Solid. |
| 3-K₃A | Lauric | 2 | 400 | 2.8 | Viscous liquid. |
| 4-K₃A | Palmitic | 3 | 769 | 4.1 | Do. |
| 5-K₂A | Dimeric | 1 | 600 | 2.2 | Do. |
| 6-K₃A | Alkenyl (C₁₂) succinic anhydride. | 1 | 266 | 0.5 | Solid. |
| 7-K₂A | Oleic | 1 | 282 | 1.7 | Viscous liquid. |
| 9-K₁A | do | 2 | 564 | 3.1 | Do. |
| 11-K₂A | Lauric | 2 | 400 | 2.8 | Do. |
| 13-K₂A | Ricinoleic | 2 | 598 | 3.0 | Do. |
| 1-O₂KA | Oleic | 1 | 282 | 1.5 | Do. |
| 3-A₃KA | Alkenyl (C₁₂) succinic anhydride. | 1 | 266 |  | Solid. |
| 3-A₃KA₂ | Oleic | 1 | 282 | 1.5 | Viscous liquid. |

The following table presents specific illustration of compounds other than N-400 and its derivatives.

TABLE VIII-A.—ACYLATED, PRIOR ALKYLATED BRANCHED POLYAMINE

| Example | Acylating agent | Mols of acylating agent/mol of polyamine or derivative | Wt. of acylating agent used | Mols of water removed | Physical properties |
|---|---|---|---|---|---|
| 14-K₁A | Lauric | 1 | 200 | 1.1 | Solid. |
| 15-K₂A | Ricinoleic | 3 | 894 | 3.0 | Do. |
| 16-K₁A | Oleic | 2 | 564 | 3.5 | Do. |
| 17-K₁A | Palmitic | 2 | 512 | 2.0 | Do. |
| 18-A₂KA | Stearic | 1 | 568 | 1.0 | Do. |
| 10-O₃KA | Oleic | 1 | 282 | 1.0 | Do. |
| 25-O₅KA | Linoleic | 2 | 560 | 2.0 | Do. |
| 26-A₁O₂KA | Acetic | 1 | 60 | 1.5 | Do. |
| 11-O₂AKA | Diglycolic | 1 | 134 | 1.0 | Do. |
| 14-O₂HKA | Maleic anhydride | 2 | 196 | | Do. |
| 25-A₁O₂HKA | Oleic | 1 | 282 | 1.5 | Do. |

OLEFINATION

Olefination relates to the reaction of the polyamine and derivatives with olefins The compositions of this invention, including the branched polyamine itself as well as reaction products thereof containing active hydrogens, can be reacted with unsaturated compounds, particular compounds containing activated double bonds, so as to add the polyamine across the double bonds as illustrated herein:

Where the compound contains an additional active hydrogen, other unsaturated molecules can be added to the original molecule for example:

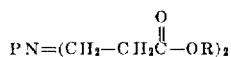

Where one or more active hydrogens are present at another reactive site, the following reaction could take place:

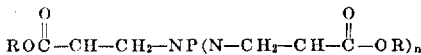

The reaction is carried out in the conventional manner such as illustrated, for example, in "Synthetic Organic Chemistry" Wagner and Zook (Wiley, 1953), page 673. Non-limiting examples of unsaturated compounds which can be reacted with the polyamine and derivatives thereof including the following—acrylonitrile, acrylic and methacrylic acids and esters, crotonic acid and esters, cinnamic acid and esters, styrene, styrene derivatives and related compounds, butadiene, vinyl ethers, vinyl ketones, maleic esters, vinyl sulfones, etc.

In addition, the polyamine and derivative thereof containing active hydrogens can be used to prepare telomers of polymer prepared from vinyl monomers.

The following are examples of olefination. The symbol employed to designate olefination is "U" and alkylation, olefination "KU."

Example 1-U

The olefination reaction is carried out in the usual glass resin apparatus. Since the reaction is that of a double bond with an active hydrogen, no water is eliminated. The reaction is relatively simple, as shown by the following example:

Charge 400 grams of N-400 (1 mol) into glass resin apparatus. Care should be taken that the N-400 is water-free, to eliminate undesirable side reactions. At room temperature, slowly add 53 grams of acrylonitrile (1 mol). The reaction proceeds smoothly without the aid of a catalyst. Warm gently to 80–100° C. and stir for one hour.

Example 6-U

To 800 grams of N-400 (2 mols) in 800 grams of xylene, add 124 grams of divinyl sulfone (1 mol) at room temperature. This reaction is exothermic and care must be taken to prevent an excessive rise in temperature which would cause cross-linking and insolubilization.

Example 3-O₁U

Same reactions as Example 1-U except that 1 mol of methyl acrylate is substituted for acrylonitrile and 3-O₁ is substituted for the N-400. Part of this product is thereupon saponified with sodium hydroxide to form the fatty amino acid salt.

Further examples of the reaction are summarized in the following table:

TABLE IX.—OLEFINATION

| Compound | Olefin | Moles of olefin/ mole of polyamine N-400 or polyamine N-400 derivative | Time | Temperature, °C. |
|---|---|---|---|---|
| 1-U | Acrylonitrile | 1/1 | 1 hr | 80–100 |
| 2-U₁ | Methyl methacrylate | 1/1 | 1 hr | 80–100 |
| 2-U₁ | do | 3/1 | 1 hr | 80–100 |
| 3-U | Ethyl cinnamate | 1/1 | 2 hrs | 120 |
| 4-U | Ethyl crotonate | 1/1 | 2 hrs | 120 |
| 5-U | Di-octyl maleate | 1/1 | 2 hrs | 150 |
| 6-U | Divinyl sulfone | 1/2 | 30 min | 90 |
| 7-U₁ | Styrene | 1/1 | 30 min | 90 |
| 7-U₁ | do | 3/1 | 30 min | 90 |
| 8-U | Lauryl methacrylate | 3/1 | 1 hr | 120 |
| 9-U | Divinyl sulfone | 1/2 | 30 min | 90 |
| 4-A₃-U₁ | Methyl methacrylate | 1/1 | 1 hr | 100 |
| 4-A₃U₁ | Divinyl sulfone | 1/2 | 30 min | 90 |
| 6-K₁U | Acrylonitrile | 2/1 | 1 hr | 70 |
| 4-A₁O₁U | Methylacrylate | 1/1 | 1 hr | 90 |
| 3-O₁U | do | 1/1 | 1 hr | 90 |
| 2-O₁AU | do | 1/1 | 1 hr | 90 |
| 9-K₁U | do | 1/1 | 1 hr | 90 |
| 7-K₂AU | do | 1/1 | 1 hr | 90 |
| 5-A₂KU | do | 1/1 | 1 hr | 90 |
| 1-O₃KU | do | 1/1 | 1 hr | 90 |

The following table presents specific illustration of compounds other than N-400 and its derivatives.

TABLE IX-A.—OLEFINATION

| Example | Branched Polyamine | Olefin | Mols of Olefin/Mol of Branched Polyamine or Branched Polyamine Derivative | Time | Temp., °C. |
|---|---|---|---|---|---|
| 10-U₁ | N-800 | Acrylonitrile | 1:1 | 1 hour | 80–100 |
| 10-U₂ | N-800 | Styrene | 1:1 | do | 80–100 |
| 10-U₃ | N-800 | Divinyl sulfone | 1:1 | do | 80–100 |
| 10-U₄ | N-800 | Di-octylmaleate | 1:1 | do | 125 |
| 11-U₁ | N-1200 | Acrylonitrile | 2:1 | 30 min | 80–100 |
| 11-U₂ | N-1200 | Methylacrylate | 1:1 | 30 min | 80–100 |
| 11-U₃ | N-1200 | Ethyl crotonate | 2:1 | 30 min | 120 |
| 11-U₄ | N-1200 | Divinyl sulfone | 2:1 | 30 min | 120 |
| 18-A₂U | N-1200 | Ethyl cinnamate | 1:1 | 2 hrs | 120 |
| 31-A U | N-1200 | Di-octyl maleate | 1:1 | 2 hrs | 120 |
| 10-O₂U | N-1200 | Methyl methacrylate | 1:1 | 1 hour | 100 |
| 21-O₁U | N-1200 | Styrene | 2:1 | do | 100 |
| 18-A₁O₁U | N-1200 | Acrylonitrile | 2:1 | do | 100 |
| 31-A₁O₂U | N-1200 | Ethyl cinnamate | 1:1 | do | 110 |
| 13-O₁AU | N-1200 | Ethyl crotonate | 1:1 | 2 hrs | 120 |
| 25-O₁AU | N-1200 | Divinyl sulfone | 2:1 | 1 hour | 80 |
| 12-O₁HU | N-1200 | Lauryl methacrylate | 3:1 | 2 hrs | 130 |
| 25-A₁O₂HU | N-1200 | Acrylonitrile | 1:1 | 1 hour | 90 |
| 16-K₃HXU | N-1200 | Divinyl sulfone | 1:1 | do | 90 |
| 15-K₁U | N-1200 | Styrene | 4:1 | do | 90 |
| 33-A₁O₁KU | N-1200 | do | 2:1 | do | 90 |
| 25-A₁O₂HKU | N-1200 | do | 1:1 | do | 90 |

CARBONYLATION

Carbonylation relates to the reaction of the branched polyamine and derivatives with aldehydes and ketones.

Where primary amino groups are present on the polyamine reactants, Schiff's bases can be formed on reaction with carbonyl compounds. For example, where an aldehyde such as salicylaldehyde is reacted with Polyamine N-400 in a ratio of 3 moles of aldehyde to 1 mole of polyamine, the following type of compound could be formed:

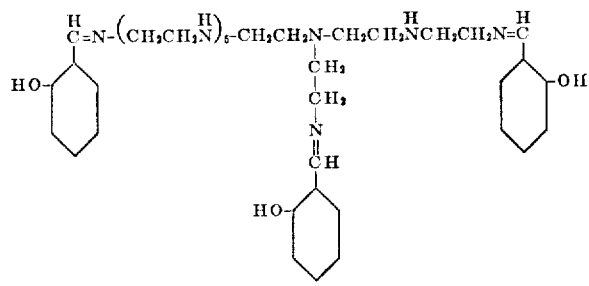

Lesser molar ratios of aldehyde to polyamine would yield mono- or di- Schiff's base rather than a tri Schiff's base such as

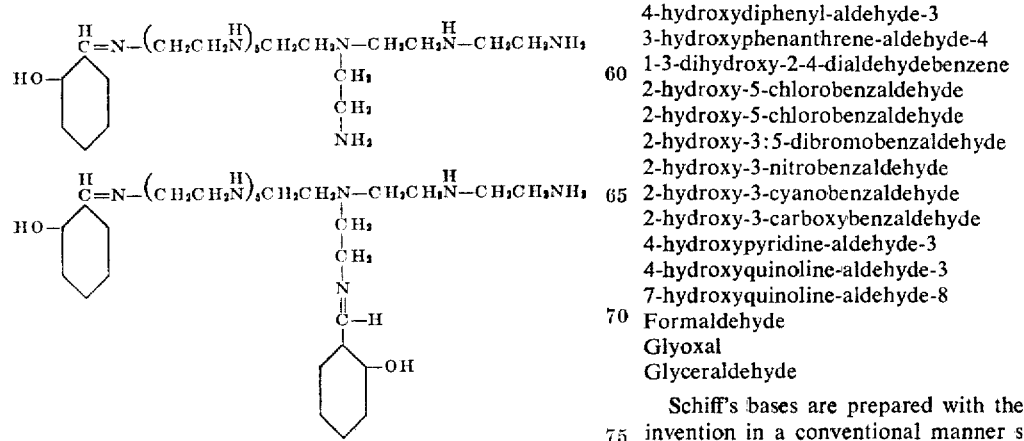

and other isomeric configurations, such as where the Schiff's base is present on the branched amino group rather than on the terminal amino group, etc.

A wide variety of aldehyde may be employed such as aliphatic, aromatic, cycloaliphatic, heterocyclic, etc., including substituted derivatives such as those containing aryloxy, halogen, heterocyclic, amino, nitro, cyano, carboxyl, etc. groups thereof. Non-limiting examples are the following:

ALDEHYDES

Benzaldehyde
2-methylbenzaldehyde
3-methylbenzaldehyde
4-methylbenzaldehyde
2-methoxybenzaldehyde
4-methoxybenzaldehyde
a-Naphthaldehyde
b-Naphthaldehyde
4-phenylbenzaldehyde
Propionaldehyde
n-Butyraldehyde
Heptaldehyde
Aldol
2-hydroxybenzaldehyde
2-hydroxy-6-methylbenzaldehyde
2-hydroxy-3-methoxybenzaldehyde
2-4-dihydroxybenzaldehyde
2-6-dihydroxybenzaldehyde
2-hydroxynaphthaldehyde-1
1-hydroxynaphthaldehyde-2
Anthrol-2-aldehyde-1
2-hydrofluorene-aldehyde-1
4-hydroxydiphenyl-aldehyde-3
3-hydroxyphenanthrene-aldehyde-4
1-3-dihydroxy-2-4-dialdehydebenzene
2-hydroxy-5-chlorobenzaldehyde
2-hydroxy-5-chlorobenzaldehyde
2-hydroxy-3:5-dibromobenzaldehyde
2-hydroxy-3-nitrobenzaldehyde
2-hydroxy-3-cyanobenzaldehyde
2-hydroxy-3-carboxybenzaldehyde
4-hydroxypyridine-aldehyde-3
4-hydroxyquinoline-aldehyde-3
7-hydroxyquinoline-aldehyde-8
Formaldehyde
Glyoxal
Glyceraldehyde Schiff's bases are prepared with the polyamines of this invention in a conventional manner such as described in "Synthetic Organic Chemistry" by Wagner and Zook (1953, Wiley) pages 728–9.

Where more extreme conditions are employed, the products may be more complex wherein the carbonyl reactant instead of reacting intramolecularly in the case of a Schiff's base may react intermolecularly so as to act as a bridging means between two or more polyamino compounds, thus increasing the molecular weight of the polyamine as schematically shown below in the case where formaldehyde is the carbonyl compound:

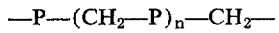

In addition to increasing the molecular weight by means of aldehydes, these compounds result in the formation of cyclic compounds. Probably both molecular weight increase and cyclization occur during the reaction.

The following examples illustrate the reaction of carbonyl compounds with branched polyamines. The symbol employed to designate carbonylation is "C," acylation, carbonylation "AC," and alkylation, carbonylation "KC."

*Example 1–$C_1$*

Charge 400 grams of N–400 and 400 grams of xylene into a conventional glass resin apparatus fitted with a stirrer, thermometer and side-arm trap. Raise temperature to 120° C. and slowly add 122 grams of salicylaldehyde (1 mol). Hold at this temperature for 2 hours. Vacuum is then applied until all xylene is stripped off. The reaction mass is a thick dark liquid which is soluble in water.

*Example 6–C*

Using the same apparatus as above, charge 400 grams of N–400. While stirring, add slowly at room temperature 82 grams of 37% aqueous formaldehyde (1 mol of HCHO). This reaction is exothermic and the temperature must be controlled with an ice bath. After the exothermic reaction has ceased, raise temperature to 100° C. The reaction mass may be stopped at this point. It is a viscous water-soluble material. However, it is possible to continue heating under vacuum until all of the water has been eliminated. Cross-linking occurs with this procedure and care must be taken to prevent insolubilization.

Further examples of this reaction are summarized in the following table:

TABLE X.—CARBONYLATION

| Compound | Aldehyde | Mol. ratio | Temp., °C | Time |
|---|---|---|---|---|
| 1–$C_1$ | Salicylaldehyde | 1/1 | 120 | 2 hrs. |
| 1–$C_2$ | do | 2/1 | 120 | 2 hrs. |
| 1–$C_3$ | do | 3/1 | 120 | 2 hrs. |
| 2–$C_1$ | 2-hydroxy-3-methoxybenzaldehyde. | 1/1 | 130 | 4 hrs. |
| 2–$C_2$ | do | 2/1 | 130 | 4 hrs. |
| 2–$C_3$ | do | 3/1 | 130 | 4 hrs. |
| 2–$C_4$ | do | 5/1 | 130 | 4 hrs. |
| 3–$C_1$ | Benzaldehyde | 1/1 | 110 | 1 hr. |
| 3–$C_2$ | do | 2/1 | 110 | 1 hr. |
| 3–$C_3$ | do | 3/1 | 110 | 1 hr. |
| 4–C | Acetaldehyde | 3/1 | 90 | 2 hrs. |
| 5–C | Heptaldehyde | 3/1 | 130 | 5 hrs. |
| 6–C | Formaldehyde | 3/1 | (¹) | 2 hrs. |
| 7–C | Glyoxal | 2/1 | 100 | 1 hr. |
| 8–C | Glyceraldehyde | 2/1 | 135 | 3 hrs. |
| 9–C | Furfuraldehyde | 2/1 | 150 | 1 hr. |
| 4–$A_2$C | Salicylaldehyde | 1/1 | 120 | 2 hrs. |
| 5–$A_2$C | do | 1/1 | 120 | 2 hrs. |
| 5–$K_2$C | do | 1/1 | 120 | 2 hrs. |
| 6–$K_1$C | do | 2/1 | 120 | 2 hrs. |

¹ Start 25° C., raise to 100° C.

The following table presents specific illustration of compounds other than N–400 and its derivatives.

TABLE X-A.—CARBONYLATION

| Compound | Branched polyamine | Aldehyde | Mol ratio | Temp., °C | Time |
|---|---|---|---|---|---|
| 10–$C_1$ | N–800 | Formaldehyde | 2:1 | 80 | 1 hour. |
| 10–$C_2$ | N–800 | do | 1:1 | 80 | Do. |
| 10–$C_3$ | N–800 | do | 0.5:1 | 80 | Do. |
| 11–$C_1$ | N–1200 | Acetaldehyde | 2:1 | 100 | Do. |
| 11–$C_2$ | N–1200 | do | 1:1 | 100 | Do. |
| 11–$C_3$ | N–1200 | do | 0.5:1 | 100 | Do. |
| 24–AC | N–1200 | Salicylaldehyde | 3:1 | 120 | Do. |
| 31–AC | N–1200 | do | 2:1 | 120 | Do. |
| 10–$O_1$C | N–1200 | do | 1:1 | 120 | Do. |
| 21–$O_1$C | N–1200 | Benzaldehyde | 3:1 | 110 | Do. |
| 18–$A_2O_3$C | N–1200 | do | 2:1 | 110 | Do. |
| 31–$A_1O_1$C | N–1200 | do | 1:1 | 110 | Do. |
| 10–$O_3$AC | N–1200 | Glyoxal | 1:1 | 105 | Do. |
| 24–$O_2$AC | N–1200 | do | 0.5:1 | 105 | Do. |
| 12–$O_1$HC | N–1200 | do | 0.25:1 | 105 | Do. |
| 26–$A_1O_2$C | N–1200 | Glyceraldehyde | 1:1 | 130 | 2 hours. |
| 10–$U_2$C | N–1200 | do | 0.5:1 | 130 | Do. |
| 11–$U_3$C | N–1200 | Furfuraldehyde | 1:1 | 80 | 1 hour. |
| 12–$O_1$HUC | N–1200 | do | 0.5:1 | 80 | Do. |

The examples presented above are non-limiting examples. It should be clearly understood that various other combinations, order of reactions, reaction ratios, multiplicity of additions, etc. can be employed. Where additional reactive groups are still present on the molecule, the reaction can be repeated with either the original reactant or another reactant.

The type of compound prepared is evident from the letters assigned to the examples. Thus, taking the branched polyamine as the starting material, the following example designations have the following meaning:

Example designation:      Meaning
 (1) A        Acylated.
 (2) AO       Acylated then oxyalkylated.
 (3) AOA      Acylated, then oxyalkylated, then acrylated.
 (4) AOH      Acylated, then oxyalkylated, then heat treated.
 (5) AX       Salt or quaternary of (1).
 (6) AOX      Salt or quaternary of (2).
 (7) AOAX     Salt or quaternary of (3).
 (8) AOHX     Salt or quaternary of (4).
 (9) O        Oxyalkylated.
 (10) OA      Oxyalkylated, then acylated.
 (11) OH      Oxyalkylated, then heat treated.
 (12) K       Alkylated.
 (13) KX      Salt or quaternary of (12).
 (14) KA      Alkylated, then acylated.
 (15) AK      Acylated, then alkylated.
 (16) AKX     Salt or quaternary of (15).
 (17) OK      Oxyalkylated, then alkylated.
 (18) OKX     Salt or quaternary of (17).
 (19) C       Carbonylated.
 (20) AC      Acylated, then carbonylated.
 (21) KC      Alkylated, then carbonylated.
 (22) CO      Carbonylated, then oxyalkylated.
 (23) U       Olefinated.
 (24) AU      Acylated, then olefinated.
 (25) KU      Alkylated, then olefinated.
 (26) KUX     Salt or quaternary of (25).

USE AS A CHELATING AGENT

This phase of the invention relates to the use of the compounds of our invention as chelating agents and to the chelates thus formed.

Chelation is a term applied to designate cyclic structures arising from the combination of metallic atoms with organic or inorganic molecules or ions. Chelates are very important industrially because one of the unusual features of the chelate ring compounds is their unusual stability in which respect they resemble the aromatic rings of organic chemistry. Because of the great affinity of chelating compounds for metals and because of the great stability of the chelates they form, they are very important industrially.

The compositions of this invention are excellent chelating agents. They are particularly suitable for forming chelates of great stability with a wide variety of metals.

Chelating metals comprise magnesium, aluminum, arsenic, antimony, chromium, iron, cobalt, nickel, palladium, and platinum. Particularly preferred of such metals as chelate constituents are iron, nickel, copper and cobalt.

The chelates formed from the compositions of our invention are useful as bactericidal and fungicidal agents, particularly in the case of the copper chelates. In addition the chelates can be employed to stabilize hydrocarbon oils against the deleterious effects of oxidation.

In general, these chelates are prepared by adding a sufficient amount of a metal salt to combine with a compound of this invention. They are prepared by the general method described in detail by Hunter and Marriott in the Journal of the Chemical Society (London) 1937, 2000, which relates to the formation of chelates from metal ions and salicylidene imines.

The following examples are illustrative of the preparation of the chelates.

*Example 8–$A_1$*

To a solution of 0.1 mole of the chelating agent of Example 8–$A_1$ in alcohol is added 0.1 mole of cupric acetate monohydrate. After most of the alcohol is evaporated, a green solid precipitates which analysis indicates to be the copper chelate.

*Example 6–$K_1$*

The above procedure is used except the cobaltous acetate tetrahydrate is employed to yield a red solid which analysis indicates to be the cobaltous chelate.

*Example 4–$A_3C_1$*

The above procedure is used except that nickelous acetate, $Ni(OAC)_2 \cdot 4H_2O$ is employed. A dark green product is formed.

To save repetitive detail, chelates are formed from the above nickel, cobalt and copper salts, and the compounds shown in the following table.

CHELATING AGENTS

Compound:
| | |
|---|---|
| N–400 | 5–$K_1$ |
| 2–$A_3$ | 6–$K_1$ |
| 3–$A_3$ | 9–$K_1$ |
| 4–$A_3$ | 1–$C_2$ |
| 5–$A_2$ | 2–$C_3$ |
| 8–$A_1$ | 3–$C_2$ |
| 9–$A_3$ | 5–C |
| 11–$A_1$ | 4–$A_3$C |
| 15–$A_1$ | 5–$K_1$C |
| 4–$K_1$ | |

Compound:
| | |
|---|---|
| N–800 | 16–$K_1$ |
| N–1200 | 17–$K_2$X |
| 24–A | 26–$A_1O_2$KA |
| 31–A | 10–$U_4$ |
| 10–$D_1$ | 11–$U_4$ |
| 11–$O_1$ | 18–$A_2O_2$U |
| 12–$O_1$ | 10–$C_1$ |
| 25–$O_5$ | 11–$C_1$ |
| 31–$A_1O_1$ | 12–$O_1$HUC |
| 12–$O_1$A | |

ANTI-SLUDGING AND COLOR STABILIZING ADDITIVES FOR FUEL OILS

This phase of our invention relates to the use of our compositions to improve hydrocarbon fuels, particularly fuel oils, since they are capable of preventing or inhibiting undesirable color formation and the sludging and clogging tendencies generally exhibited by hydrocarbon fuels, such as those utilized in burner systems, tanks, diesel and jet engines, and other industrial and domestic equipment. These compounds are particularly useful in engines such as jet and diesel engines, where the problem of thermal stabilization arises. In addition, they are capable of removing preformed deleterious matter from filters, screens, and the like, which deleterious matter is formed by deterioration of and/or the presence of foreign bodies (e.g. water) in the fuel oils.

Hydrocarbons, such as distillate fuels, for example, those having a normal distillation range of from about 300° F. to about 700° F., and particularly those from about 340° F. to about 640° F., generally have a marked tendency to deteriorate under oxidizing conditions, and to form sludge. Also, the presence of impurities in such fuels, such as the presence of moisture, dispersed water, organic and/or inorganic foreign matter and the like, causes the formation of insoluble products which tend to settle out and adhere to surfaces with which they come in contact, thereby in turn, causing clogging or plugging of filters, strainers, screens, conduit lines, and the like, of the equipment in which they are used. This necessitates frequent cleaning and even replacement of parts, thereby markedly decreasing the performance efficiency of various equipment which utilized such fuel oils.

The problem of screen clogging is common, particularly in domestic fuel oil systems employing distillate fuel oils produced by distillation or cracking of petroleum, which fuels are characterized by their relatively low viscosity and other properties. Fuel oils of this type generally conform to the specifications set forth in Commercial Standards C.S. 12–40 for Nos. 1, 2 and 3, Fuel Oils. Petroleum distillates within the ranges specified and which generally do not exceed 700° F., and preferably are below 675° F., for use as diesel fuels, are further examples of the type of oils which under conditions described herein have a tendency to clog screens or filters, particularly when such fuels contain minor amounts of water dispersed therein.

Another place where screen clogging and plugging of conduit lines is encountered is in fuel oil storage tanks, which latter may be connected to burner systems or engines, etc. The stored fuel generally comes in contact with air, moisture, etc., which causes formation and precipitation of sludge materials, the latter depositing on and clogging the screens or filters used for protecting the burners or engines using such fuel oils.

The compositions of this invention inhibit sludging tendencies of hydrocarbon fuel oils. They inhibit sludging and precipitation of contaminants in hydrocarbon distillate fuel oils, particularly in cracked hydrocarbon fuels. They also provide distillate fuel oil compositions, particularly of fuel oils obtained during cracking of hydrocarbons, which fuel oil compositions have excellent performance characteristics with respect to freedom from screen clogging, even after extensive storage under oxidizing conditions and in the presence of water. They also provide distillate fuel oil compositions which are effective in removing preformed sludge deposits formed in fuel oil systems. In addition they provide a particular type of distillate fuel oil composition or a blend thereof, which is non-corrosive, stable, and effective for removing sludge and for cleaning metal surfaces.

These improvements are attained by dispersing, admixing with or dissolving in hydrocarbon fuel oils (which normally have a tendency to cause clogging or plugging of screens or the like) a minor amount, which is sufficient to inhibit said tendencies, of the compositions of this invention, for example, from 0.001% to 1%, but preferably from 0.003% to 0.010% by weight based on the fuel. If desired, a minor amount of a detergent, dispersant and/or solubilizer may also be added to the composition.

For ease of handling a concentrate of the compounds of this invention in a hydrocarbon oil can be prepared, for example, in concentration of from 5%–50% or higher. This concentrate is then added to the fuel having sludging tendencies to yield the desired active concentration. Other additives can also be added to this concentrate such as oil soluble petroleum sulfonate salts, drying agents, etc.

The hydrocarbon distillate fuel oils in which the active ingredient and/or ingredients of this invention are dispersed or dissolved may be treated or untreated cracked fuel oils, or mixtures of cracked fuels with straight run fuel oils, said fuel oils having components normally distilling from about 300° F. to about 700° F. Preferred fuels have a boiling range of from about 340° F. to about 700° F., and particularly from about 400° F. to about 675° F. Specifically, hydrocarbon distillates which are utilized as bases in compositions of this invention are cracked gas oils, fuel oils, furnace oils, burner oils, diesel fuel oils, kerosene, etc., or mixtures of said cracked fuels with the corresponding or like straight run hydrocarbon fractions. Jet fuels include those of JP–1 to JP–6 specifications.

In general, fuel oils which have marked tendencies towards sludging and clogging of screens, filters, etc., are primarily cracked or blends of cracked and straight run fuel oils which have the following properties:

Gravity, ° API _____ 29–35
ASTM dist., ° F.:
    IBP _____ 400–500
    EBP _____ 600–700
Sulfur, percent wt. _____ 0.5–1.05
Carbon residue (10 btms.), percent wt. _____ 0.1–1.4
Pour point, ° F. _____ 0–15

In systems wherein substantial amounts of moisture are present a drying agent may be added which is compatible with the active ingredients of this invention. By tying up most of the free moisture in this manner, the amount which would normally combine with sludge-forming materials is diminished, thus alleviating a most aggravating clogging problem.

To distillate fuel oil compositions of this invention may also be added minor amounts of a foaming inhibitor such as silicone liquids, e.g., dimethyl silicone, fluoro organic compounds, chloro paraffins, salts of alkyl alkylene phosphates and the like. Compositions of this invention may be used to remove deposits, formed on metal surfaces such as in tubes, evaporators, heat exchangers, distillation and cracking equipment and the like. They are non-corrosive and do not interfere with the functioning of the liquid in which dispersed.

The following examples illustrate the effectiveness of compositions of this invention as sludge inhibitors and anti-clogging agents. They are tested by the following tests.

Test I

*The 110° F. accelerated storage test.*—This test is widely accepted throughout the industry as useful in predicting the amount that will form in a fuel oil during normal storage conditions. One week at 110° F. is approximately equal to one month ambient storage. The test is run for six weeks and the mgs. of sludge/100 ml. of oil and the color (optical density units) are compared to a control containing no additive.

Test II

*The 90 minute 300° F. diesel test.*—This is the thermal test specified by railroad for fuel oil used in diesel engines. Sludge and color are similarly compared.

The following compounds exhibited diminished sludge and color formation in concentrations of 50–150 p.p.m. with #2 fuel and a #2 diesel oil.

ANTI-SLUDGING AND COLOR STABILIZING ADDITIVES FOR FUEL OILS

Compound:

| | |
|---|---|
| $2-A_2$ | $5-A_1O_3$ |
| $5-A_1$ | $2-O_2A$ |
| $5-A_2$ | $7-O_1A$ |
| $6-A_1$ | $8-O_1A$ |
| $8-A_1$ | $1-K_3$ |
| $2-O_3$ | $2-K_2$ |
| $3-O_2$ | $3-K_2$ |
| $6-O_1$ | $4-K_2$ |
| $7-O_2$ | $5-K_3$ |
| $8-O_1$ | $6-K_2$ |
| $4-A_1O_1$ | $7-K_2$ |
| $4-A_1O_2$ | $10-K_2$ |
| $4-A_1O_3$ | $2-K_2A$ |
| $5-A_1O_2$ | $3-K_2A$ |

Compound:

| | |
|---|---|
| $5-K_2A$ | $18-O$ |
| $2-U_2$ | $24-O_1$ |
| $7-U_2$ | $26-O_2$ |
| $8-U$ | $18-A_2O_5$ |
| $1-C_3$ | $31-A_1O_3$ |
| $2-C_3$ | $13-O_1A$ |
| $5-C$ | $2-O_2A$ |
| $8-C$ | $33-A_1O_1K$ |
| $4-A_3C$ | $18-A_2KA$ |
| $5-A_2C$ | $18-A_2U$ |
| $5-K_2C$ | $13-O_1AU$ |
| $18-A_1$ | $18-A_2O_3C$ |
| $30-A$ | $26-A_1O_2C$ |
| $12-O_3$ | |

USE AS ANTI-STALLING AND ANTI-ICING ADDITIVES

This phase of the invention relates to gasoline fuel compositions for use in internal combustion engines and is particularly concerned with new gasoline compositions adapted to provide improved engine operation under cool and humid weather conditions.

A well known difficulty encountered in the operation of automobile engines in cool and humid weather is that of frequent engine stalling during the warm-up period. The trouble is most prevalent in northern climates during the fall and winter periods. Its cause has been traced to the formation of ice in the carburetor of the engine. Although the difficulty has existed for a long time, it has become more prevalent than ever in recent years due to the use of more highly-volatile, winter-grade gasolines. Thus, the evaporation of gasoline in the carburetor produces a considerable cooling effect which is more pronounced with the higher volatility gasolines. In cool, moist weather, this cooling effect is sufficient to cause condensation and freezing of the moisture present in the air entering the carburetor. Consequently, in the period before the engine becomes warm, ice is formed which restricts the air-intake openings and causes the engine to stall. It has been found that conditions particularly conducive to stalling difficulties due to ice formation in the carburetor are ambient temperatures of from about 30° F. to about 65° F., when the relative humidity is above about 65%. The stalling occurs most readily when the engine is idling and although the frequency of stalling is greater with gasolines of higher volatility, such as those provided for winter use in northern climates, the difficulty is experienced with all types of commercial gasolines in all types of cars.

In accordance with the present invention, it has now been found that stalling difficulties due to formation of ice in the carburetor of an engine can largely be overcome by incorporating in the gasoline a minor amount of the products of this invention.

As is well known to those familiar with the art, a gasoline is a mixture of hydrocarbons having an initial boiling point varying between about 75° F. and about 135° F. and an end-point varying between about 250° F. and about 450° F. and boiling substantially continuously therebetween.

The compounds of this invention provide excellent anti-icing properties in all types of gasolines. The gasoline may be comprised of straight-run or cracked petroleum distillates boiling in the gasoline range which have been derived from either paraffinic, naphthenic, mixed base or other crude petroleums. Also, it may comprise products prepared by special processes, such as polymerization, alkylation, hydrogenation, etc. Mixed distillate and/or processed stocks including stocks which have been subjected to various refining treatments, such as acid extraction, solvent treating, etc., are all improved with respect to their anti-icing character by treatment with the compounds of this invention.

It will be appreciated that many commercially available gasolines, including those of the so-called winter grade type, are less volatile than the gasoline used in the tests described herein and are, therefore, less susceptible to stalling under stall-inducing weather conditions than the test gasoline. Nevertheless, such gasolines are prone to produce stalling and they are benefited with respect to their stalling tendencies by the use of our compounds. As a rule, somewhat smaller amounts of the additive may be used with gasolines of relatively low volatility, while somewhat larger amounts may be required for higher volatility gasolines. Broadly, the amount of the additive contemplated for use ranges from less than about 0.003 weight percent up to more than 0.009 weight percent, the particular amount depending upon the particular gasoline to which it is added. The use of from about 0.006 to 0.009 weight percent, however, is generally preferred.

Our compounds can be used in gasolines containing other additives designed to improve the gasoline in various other respects. Thus, it will improve the anti-icing character of gasolines containing metallo-organic anti-knock agents, such as tetraethyl lead. The tetraethyl lead is ordinarily present in amounts of from about 1 to about 5 ccs. per gallon. As is well known, these gasolines ordinarily contain an organic halide lead-scavenger, such as ethylene dichloride, ethylene dibromide or the like.

The gasolines can also include an anti-oxidant of the polyalkylated phenol type, such as, for example, 2,6-ditertiary butyl para-cresol; 2,4,6-tributyl phenol, 2,4-dimethyl, 6-secondary butyl phenol, or the like. Suitable amounts of such an anti-oxidant vary from about 0.0004 to about 0.001 weight percent.

The invention also contemplates the use in leading gasolines of an additive capable of inhibiting preignition, particularly in gasolines designed for use in high compression engines. Ethers of phosphorus acids, for example triphenyl phosphate, tricresyl phosphate, trimethyl phosphate, diphenyl cresyl phosphate and trimethyl phosphite, are contemplated for this purpose. Phosphorus acid esters containing halogen and sulfur constituents, such as, for example, tri-beta-chloro propyl thionophosphate, are also suitable. Such additives are used in amounts of from about 0.01 to about 0.03 weight percent.

The gasolines can further contain additives that deactivate metals, such as copper, etc., which catalyze oxidation of the gasoline. Metal deactivators of the Schniff base-type are particularly contemplated. These compounds are produced by the condensation of one mol of a polyamine having two primary amine groups with two mols of an aromatic ortho-hydroxy-substituted aromatic aldehyde. A particularly effective compound is N,N'-disalicylal 1,2-propylene diamine. From about 0.00004 to about 0.0004 weight percent of the metal deactivator is ordinarily used.

Illustrative of specific gasoline compositions contemplated by the present invention are the following:

(A) A premium gasoline for use in high-compression engines is prepared as follows: To a gasoline comprised, on a volume basis, of approximately 40% thermal, 30% catalytically cracked and 30% straight run components, the following are added:

(a) 0.009 weight percent of the compounds of this invention
(b) 0.02 weight percent diphenyl cresyl phosphate
(c) 0.004 weight percent 2,6-ditertiary butyl para cresol
(d) 0.0002 weight percent disalicylal, 1,2-propylene diamines
(e) 2.5 cc. T.E.L. per gallon.

(B) Same as (A) except that (b) is 0.02 weight percent tribeta-chloropropyl thionophosphate.

CARBURETOR ICING TESTS

The ability of these compounds to prevent engine stalling, under conditions conducive to carburetor icing is demonstrated by means of a series of cold-starting tests. A base gasoline consisting of 100% straight-run component and having the following properties is utilized in the tests:

Boiling point:
    Initial _____ °F__ 126
    10% _____ °F__ 154
    50% _____ °F__ 182
    90% _____ °F__ 222
    End _____ °F__ 278
Reid vapor pressure _____ 5.8
Gravity, °API _____ 66.7

This gasoline is selected on the basis of its high volatility which makes it particularly susceptible to stalling under cool, humid operating conditions.

The test procedure is as follows: A standard Chevrolet engine is installed in a "cold" room equipped with temperature and humidity controls. With the room temperature maintained at approximately 44° F. and the relative humidity at approximately 97%, the engine is started and operated for one minute at 2000 r.p.m., with no load. At the end of the one minute operation, the engine speed is reduced to 500 r.p.m. and the time required for the engine to stall is noted. It has been determined previously that under these particular conditions of temperature and humidity, and using the aforedescribed base gasoline, the engine stalls immediately when the speed was cut back after the one minute operation period. A series of tests are conducted employing the base gasoline containing the compositions of this invention in order to determine the amount required to provide a practicable delay in the stalling time. The following compounds when tested according to this test are superior, in concentrations of 0.006–0.009 wt. percent, to the corresponding gasoline containing no anti-stalling additive.

ANTI-STALLING AND ANTI-ICING ADDITIVES

Compound:
    $2-A_3$            $4-A_1O_1$
    $3-A_3$            $A-A_1O_2$
    $4-A_1$            $4-A_1O_3$
    $5-A_1$            $5A-_1O_1$
    $6-A_1$            $5-A_1O_2$
    $7-A_2$            $5-A_1O_3$
    $8-A_1$            $1-K_3$
    $9-A_1$            $3-K_2$
    $10-A_1$           $4-K_2$
    $13-A_1$           $5-K_2$
    $16-A_1$           $6-K_2$
    $17-A_2$           $7-K_2$
    $2-O_1$            $10-K_1$
    $3-O_1$            $1-K_1A$
    $7-O_1$            $2-K_2A$
    $8-O_1$

ANTI-STALLING AND ANTI-ICING ADDITIVES—
Continued

Compound:

| | |
|---|---|
| 5-K$_2$A | 18-O |
| 6-K$_3$A | 24-O$_1$ |
| 7-U$_2$ | 26-O$_2$ |
| 8-U | 18-A$_2$O$_5$ |
| 1-C$_3$ | 22-A$_1$O$_1$ |
| 2-C$_3$ | 25-AO$_2$ |
| 5-C | 33-A$_1$O$_1$ |
| 8-C | 14-O$_2$A |
| 5-A$_2$C | 18-OA |
| 18-A$_1$ | 24-O$_2$A |
| 23-A | 10-O$_3$K |
| 27-A | 18-A$_2$KX |
| 14-O$_2$ | 18-A$_2$KA |
| 16-O$_4$ | 18-A$_2$O$_1$U |

USE IN THE FOG INHIBITION OF HYDROCARBONS

This phase of this invention relates to the use of the compositions of our invention to produce a fog-inhibited hydrocarbon product when added to a hydrocarbon product.

The term "fog," as herein used, does not refer to the aerosol type of fog but, rather, to the cloudiness caused by the presence of minute droplets of an aqueous medium suspended in a hydrocarbon product. In the present application the term "hydrocarbon product" is used with reference to transparent or semi-transparent hydrocarbon products, usually but not invariably overhead fractions such as gasoline, kerosene, diesel fuel, stove oil, gas oil, cleaners' solvent, benzene, toluene, xylene, etc.

Many hydrocarbon products found in commerce contain dissolved water which is precipitable when subjected to reduction in temperature, or other changes in equilibrium, resulting in the precipitation of droplets which are visible as a fog. In other instances, hydrocarbon products are encountered which contain such fogs. Such precipitates are detrimental to the value of such products. This is particularly true in the transparent or semi-transparent hydrocarbon oils where such fogs make the oil less desirable and affect the merchantability of the oil. Particular examples of such products include kerosene, gasoline, stove oil, and the like, which are frequently manufactured in the warmer climate of the Gulf Coast States and then shipped and stored in the Northern States with the result that the oils become fogged or cloudy even though originally clear and bright.

This phase of the invention in its principal aspects is concerned with the prevention, elimination or suppression of fog due to precipitation of water particles in hydrocarbon products arising from various causes, particularly temperature drop, instability resulting from supersaturation, etc. This objective is accomplished by the use of minute quantities of additives herein described. This phase of the invention is also concerned with fogs caused by any precipitated aqueous phase or dilute aqueous solution, e.g., a dilute solution of an acid, salt, base or organic compound, as well as pure water. For sake of convenience, any such aqueous media are hereinafter referred to merely as water in view of the fact that it is the aqueous content which gives rise to the problems here solved.

Another important aspect, from the practical standpoint, is the prevention of the precipitation of water from hydrocarbon distillates and other products of conventional refining processes where there has been prior contact with water. Precipitation may then occur during passage through the colder portions of pipe lines. Such precipitated water is frequently highly corrosive and sometimes separates from the hydrocarbon product to produce pockets in the pipe lines.

All hydrocarbon products do not necessarily produce fogs upon reduction in temperature as often met in commerce for various reasons. The present invention is concerned with those hydrocarbon products which are susceptible to fogging.

The prevention or elimination of fogging in hydrocarbon products is a long-recognized problem of commercial importance as is set forth in the issue of National Petroleum News for January 3, 1945, R–63. It has been previously proposed to remove the dissolved moisture from these hydrocarbon products by means of solid desiccating agents such as activated alumina, silica gel, etc. These processes are functional but costly in material, operation and maintenance. In many instances the dissolved water has been removed by blowing the hydrocarbon product with dry air. This method is highly objectionable because of loss of valuable volatile components of the hydrocarbon product and because of the introduction of oxygen into the system, leading to oxidative degradation of the product as manifested by damage to color. Other solutions to the problem are characterized by a mechanical approach.

This phase of our invention represents a practical solution to this problem of inhibiting fog formation, permitting this to be accomplished at a very low cost in materials, equipment and labor, and without any deleterious effect upon the hydrocarbon product. In the present process of prevention of fog formation, the additives are employed in such small amounts as to make the processed hydrocarbon product identical in all other respects with the untreated product.

This phase of the invention is concerned with the presence or potential presence of only those fogs which are visible, these being detectable by visual or light-transmission methods. Suspended water droplets in a hydrocarbon product produce visible fogs only if the droplets are of minute size. Water droplets of large size do not necessarily produce visible fogs and will often settle out on standing. However, upon cooling of a hydrocarbon product containing dissolved water to saturation, at least a portion of the dissolved water will precipitate as a visible fog, the water droplets being of such small size as to remain in suspension for long periods of time, often indefinitely. Droplets of this size give rise to the fogs with which this invention is concerned.

A perfectly clear hydrocarbon product may contain water to saturation at its existing temperature, in which event a cooling of only a few degrees will usually produce an objectionable fog. If such a clear hydrocarbon product does not contain dissolved water to saturation, cooling to the temperature at which it will be saturated will not produce such a fog, but cooling several degrees lower will. If a hydrocarbon product contains such a fog at an existing temperature it is usually evidence that the dissolved water is present to saturation and that more water will precipitate to increase the fog density if the product is cooled below such existing temperature through a given temperature range. The process contemplates incorporation of a minute quantity of a compound of this invention into the hydrocarbon product to clear such an existing fog and inhibit the hydrocarbon product against fog formation when cooled through such range.

The amount of water which can be dissolved in a hydrocarbon product depends upon the particular product and the ambient temperature. The solubility of water in the lighter petroleum fractions such as gasoline is about 0.01% at ordinary temperatures. That for the heavier fractions may be considerably less, whereas aromatic hydrocarbons such as benzene may dissolve water to the extent of approximately 0.1%. As to temperature, there is approximately a tenfold increase in solubility for a 100° F. temperature difference. A fog may result from the solubility decrease due to a small temperature drop and may be visible when the precipitated water is only a few thousands of a percent. An objectionable fog may appear with a temperature drop of approximately 10° F. or less.

Hydrocarbon products can be protected against fogging upon temperature reduction by subjecting the product to the action of extremely minute amounts of our compounds. Also, by employing somewhat larger, through still minute, amounts of such agents, existing fogs can be eliminated and the hydrocarbon product protected to the same extent against later fogging upon reduction in temperature. These agents can be added directly to the hydrocarbon product. However, it is preferable and more convenient to dissolve our compounds in an oil miscible with the hydrocarbon product to form a reagent solution which is then mixed with the hydrocarbon product. The oil is usually a hydrocarbon and its quantity, while not critical, should be minimized. Inclusion of water in the reagent solution should be minimized, it being desirable to use an essentially anhydrous solvent for these agents.

As to the optimum amount of the additive used, this will depend on the amount of the particular agent in terms of absolute concentration, the amount, if any, of fog already present and which is to be cleared, and the temperature range over which protection against fog formation is desired. As to this last factor, protection over a temperature differential of about 40° F. is usually sufficient commercially, e.g., over a temperature range of about 75° F. to 35° F.

Using the temperature range as a criterion and assuming that no substantial fog is initially present, the addition of our compounds in minute amounts varying from as little as one part in 50,000 or even less, to as much as one part in about 2500 is sufficient, ratios or percentages herein being expressed on a volume basis. Such amounts, for example, are amply sufficient on California diesel fuels and the Gulf Coast furnace oils. If there is initially present in the hydrocarbon product a fog resulting from the precipitation of water due to period cooling to the existing temperature, this fog can be cleared and some protection given against later fog formation, if cooled below the existing temperature, by use of the exemplified amounts. In effect, if addition of one part in 6000 to a saturated but essentially fog free hydrocarbon product at 75° F. will protect against fogs with reduction in temperature to 35° F., addition of the same amount to a fogged hydrocarbon product at, say 60° F. will clear the fog and protect against fogs to a temperature of about 35° F. In this latter instance, if full protection against a 40° F. temperature drop below 60° F. is required, slightly more than one part in 6000 should be used.

Protection to a temperature of about 35° F. is usually sufficient in commerce as the hydrocarbon product at that temperature contains so little dissolved water that further cooling will not produce a significant additional quantity of fog. However, if protection from 100° F. or above down to 35° is desired, the ratios of reagent to oil, given above, should be increased substantially in proportion to the increased solubilities at the higher temperatures.

The agent can be added to the hydrocarbon product at any existing temperature. However, in treating high-temperature products, e.g., products issuing from distillation equipment at temperatures of 100° F. or higher, it is often preferable to cool the product to some temperature intermediate the highest and the lowest temperatures between which protection against fog is desired and to add the agent at such intermediate temperature in amount sufficient to clear any fog formed during the cooling and sufficient to protect against fog formation during later cooling to such lowest temperature at which protection is desired.

In the commercial application of the process it is desirable to add the fog suppressant at the lowest convient temperature. On cooling to this temperature, some of the water precipitated from solution may, in some instances, separate. In this event the fog suppressant need be added only in the amount determined by the fog and dissolved water remaining and not by the entire original water content.

The agent should be soluble, in the ratios used, in the hydrocarbon product or in the aqueous medium therein. In view of the minute amounts employed in the process, substantially all of the compounds of our invention fulfill this requirement.

The process is not to be confused with dehydration processes where emulsions, usually of crude oil and dispersed brine, are mixed with de-emulsifying agents to destabilize the oil-water interfaces so that coalescense of the dispersed droplets occurs when a controlled agitation brings two droplets into contact. In such processes the coalescence is continued until the coalesced masses are of such size as to gravitate from the oil. In the present process there is no coalescence and the separation of the aqueous droplets and the over-all aqueous content of the hydrocarbon product remains the same albeit any existing fog is caused to disappear. The amount of aqueous medium present must not substantially exceed that which the hydrocarbon product can take up after our compounds have been added and at the lowest temperature at which protection is desired. If the hydrocarbon product contains more than such small amount of aqueous medium it should be dehydrated by other methods before applying the process of the present invention. The present process is best suited to hydrocarbon products supersaturated with less than 0.01% of the aqueous medium or to hydrocarbon products containing dissolved water not substantially in excess of the amount required to saturate the hydrocarbon product at about 150° F. when the agent is not present.

A visual determination of the necessary amount of reagent to be employed is often satisfactory. In such a determination, a sample of the hydrocarbon product, which has been carefully excluded from agitation with air, is introduced into a 4-oz. screwcap glass bottle so as to fill it within a few tenths of a milliliter of its total capacity. The reagent, usually a dilute solution in oil, is then added in a predetermined amount and the tightly closed bottle immersed in a cooling bath. The bottle is observed periodically until the desired cooling has been attained and the degree of fog formation is then visually observed in diffused daylight. For detection of extremely slight fog formation, the direct rays of the sun are used for the examination. The comparative degree of fog formation can be determined by comparison with a control bottle containing the same hydrocarbon product and which has been subjected to the same treatment except for the addition of the reagent.

The following examples are presented by way of illustration.

EXAMPLES

A California light diesel fuel is saturated with water at 75° F. The addition of 0.5 part, by volume, of the compositions shown in the following table per 1000 parts of the saturated fuel prevents the formation of fog when the temperature is reduced to 35° F. Without the addition of such additives a fog forms when the diesel fuel is cooled to 35° F.

Similar reductions in cloud point are noted employing these compositions with other fuels, namely gasoline, kerosene, stove oil and Stoddard solvent.

USE IN THE FOG INHIBITION OF HYDROCARBONS

Compound:

| | |
|---|---|
| $2-O_4$ | $7-A_2$ |
| $2-O_7$ | $9-A_3$ |
| $4-O_1$ | $2-O_4A$ |
| $4-O_2$ | $4-O_2A$ |
| $5-O_3$ | $5-O_3A$ |
| $5-O_4$ | $6-O_3A$ |
| $6-O_4$ | $6-O_5A$ |
| $6-O_5$ | $3-A_3O_2$ |
| $3-A_1$ | $7-A_1O_3$ |
| $5-A_1$ | $11-A_1O_2$ |
| $6-A_1$ | $2-O_1H$ |

Compound:

| | |
|---|---|
| $4-O_5H$ | $25-AO_2$ |
| $1-A_4O_3H$ | $27-A_1O_4$ |
| $7-A_1O_2H$ | $10-O_3A$ |
| $23-A$ | $25-O_4A$ |
| $32-A_1$ | $18-A_2O_1H$ |
| $12-O_3$ | $10-O_3K$ |
| $15-O_2$ | $16-K_2X$ |
| $17-O$ | $16-K_1A$ |
| $24-O_1$ | $12-O_1HU$ |
| $26-O_1$ | $10-O_3AC$ |
| $18-A_2O_5$ | |

USE AS COPPER DEACTIVATORS

This phase of the invention relates to the stabilization of organic substances, and particularly to the protection of organic substances against the deleterious action of oxygen catalyzed by the presence of copper and its compounds, and more particularly to the preservation of oxidizable mineral hydrocarbons containing or in contact with copper and its compounds.

Many organic substances, such as animal and vegetable fats and oils, edible oils, vegetable juices, textile fibers, petroleum products, photographic developers and synthetic unsaturated compounds, deteriorate upon exposure to the atmosphere over periods of time, which deterioration is due to oxygen. Such attack by oxygen produces oxidation products, disaggregation or polymerization, or a combination of two or three thereof. The disaggregation and polymerization is generally induced by the primary oxidation products which apparently act as catalysts to accelerate the deterioration. This phenomenon, generally termed auto-oxidation, usually proceeds very slowly at first, but gradually accelerates until a maximum is reached. The initial period of negligible reaction rate is called the induction period. Such deterioration imparts undesirable qualities to the organic substances and eventually destroys their usefulness.

Signal success has been achieved in the preservation of many organic substances by the discovery and use of compounds generally called "oxidation inhibitors," "antioxidants," "preservatives," "anti-agers" and "gum inhibitors." Such agents, which are mostly oxidizable organic compounds, are oxidized in the course of time, and hence the beneficial effect obtained by their use is not permanent. They protect the organic substances only so long as they are not rendered inactive. They are, moreover, very specific in their action, each type of auto-oxidizable substance requiring a different type of "antioxidant" for the best results.

It is well known that copper and its compounds promote the formation of gum in gasoline, speed the aging of rubber and the development of rancidity in fats and oils. In other words, copper and its compounds accelerate the rate of oxidation of oxidizable organic substances, including most of the antioxidants. Accordingly, copper and antioxidants are antagonistic in action and the normal effect of the anti-oxidant is greatly reduced in the presence of copper and its compounds.

Copper, as such, or in the form of its compounds, occurs naturally in many organic products, frequently in such slight traces as to cause very little harm. However, the concentration of copper and its compounds is frequently increased during the course of handling and utilizing the substances. Vessels and conduits made of metals containing copper are used for storage and transportation. Ingredients contaminated with copper or its compounds are sometimes added to the organic substances. In some cases, copper, as such or in the form of its compounds, is actually required in at least one of the steps in the preparation of the organic substances, as in the sweetening of gasoline with cupric chloride. Therefore, although copper and its compounds are not necessarily present in organic substances which are not derivatives of copper, they are frequently present, at least accidentally, in many organic substances. The activity of copper and its compounds to catalyze oxidation of oxidizable organic substances is inherent and is possessed by the copper in the various media unless the activity has been modified or suppressed by chemical means.

There are three possible methods of preventing the harmful effect of copper and its compounds. The copper and its compounds may be removed by purification, but this is frequently impossible and usually too costly to be practicable. In certain cases, it is possible to add sufficient amount of an antioxidant to the organic substance containing the copper or its compound so that the preserving effect of the antioxidant is equal to or greater than the effect of the copper present. However, the efficiency of the antioxidant, under such conditions, is so greatly diminished that very large amounts of antioxidant are necessary and the advantage gained is seldom worth the cost of the increased quantity of antioxidant required. The third method comprises suppression of the catalytic activity of the copper by chemical means without removing the copper from the organic substance. The present invention is directed to this third expedient. Compounds capable of effectively suppressing the catalytic activity of copper and its compounds are hereinafter named generically as "copper deactivators."

While the so-called "antioxidants" are specific to the type of organic substance, it has been found that copper deactivators are specific for copper and its compounds and are independent of the organic substance. Insofar as the organic substance to be stabilized is concerned, the only requirements are that the copper deactivator is soluble therein and that the organic substance is not strongly acid so as to destroy the copper deactivator compound.

The quantity of copper deactivator added will be dependent upon the amount of copper present in the organic substance. At least one mol of copper deactivator must be added for each atom of copper in the organic substance. Preferably from about 1.5 to 100 mols of copper deactivator is used for each atom of copper in the organic substance. From about 0.0002 to about 0.01% of copper deactivator based on the organic substance will generally be satisfactory in most organic substances where the copper or copper compound is accidentally present. Higher ratios of copper deactivator may be used, particularly when the organic substance is in contact with metallic copper in bulk which forms a reservoir of copper ions.

Our copper deactivators may be added to the organic substances to be treated in any desirable form and manner. They may be in solid or liquid form, mixed with other addition agents or dissolved in a solvent. The components of the copper deactivators may be separately added to the organic substance, so that the deactivators are formed in the organic substance. If the organic substance already contains one of the parent compounds, the other raw material may be incorporated and the deactivator formed in situ. Our copper deactivators may be added to the finished organic substances or to such substances at any stage in the processes of manufacture or handling.

While we have illustrated the effect of our copper deactivators in gasoline, these copper deactivators are effective for suppressing the deleterious effect of copper and its salts in motor benzol, fuel oils, heating oils, animal fats and oils, vegetable fats and oils, edible oils, drying oils, soaps, photographic developers, gasoline antioxidants, vegetable juices and rubber. It is merely necessary to employ a copper deactivator which is soluble in the organic substance to be protected, avoiding conditions such as the presence of substantial amounts of strong mineral acids which would destroy the copper deactivator. Accordingly, our copper deactivators will be found to be effective in petroleum products and mineral hydrocarbons such as gasoline, kerosene, fuel oil, transformer oil, lubricating oil and the like; fats; waxes, animal and vegetable fats and oils, and derivatives obtained therefrom such as soaps; sulfonated and sulfated oils, including alcohol sulfates; fruit and vegetable juices; essential oils, perfumes; cotton; silk; paper; wool; cellulose acetate; regenerated cellulose products; synthetic products, such as photographic developers, anti-oxidants, and conjugated dienes and their polymerization products, particularly chloroprene, "Neoprene" and "Neoprene" latex. The deactivators also function in solutions of such organic substances in different solvents, as well as in mixtures of such substances.

From all of the above, it will be apparent that, by our invention, we have made it possible to stabilize many organic substances, susceptible to the harmful action of oxygen catalyzed by copper and its compounds, by the addition of one or more members of a class of compounds which suppress the harmful activity of the copper and its compounds. We have shown that the deactivator is effective alone or in combination with an amount of an antioxidant which is generally required to stabilize the products in the absence of copper. Thus, we have made it possible to effectively and economically stabilize organic substances by means of antioxidants even in the presence of copper and its compounds without it being necessary to employ large amounts of antioxidant to overcome the catalytic action of the copper.

Employing ASTMD525 to test the oxidation stability of gasoline by the induction period method (which is a method designed to check the relative prolonged storage life of gasolines), the following compounds impart greater stability to the gasoline employed as compared to those containing no copper deactivator. In addition, they enhance the stability of the gasoline in conjunction with an anti-oxidant as compared to the use of anti-oxidant (2,6-ditertiary butyl-para-cresol) alone.

COPPER DEACTIVATORS

Compound:

| | |
|---|---|
| N–400 | 20–$A_1$ |
| 2–$A_3$ | 27–A |
| 3–$A_3$ | 30–A |
| 4–$A_3$ | 10–$O_2$ |
| 5–$A_3$ | 12–$O_2$ |
| 8–$A_1$ | 14–$O_2$ |
| 9–$A_3$ | 26–$O_1$ |
| 11–$A_1$ | 18–$A_2O_5$ |
| 15–$A_1$ | 22–$A_1O_1$ |
| 4–$K_1$ | 33–$A_1O_1$ |
| 5–$K_1$ | 18–OA |
| 6–$K_1$ | 25–$O_4$A |
| 9–$K_1$ | 18–$A_2O_3$H |
| 1–$C_2$ | 14–$K_2$ |
| 2–$C_3$ | 16–$K_3$ |
| 3–$C_2$ | 31–$A_1$K |
| 5–C | 14–$O_2$HK |
| 4–$A_3$C | 14–$K_2$X |
| 5–$K_1$C | 25–$O_3$KA |
| N–800 | 10–$U_6$ |
| N–1200 | 11–$C_2$ |
| 18–$A_2$ | |

Having thus described our invention, what we claim as new and desire to obtain by Letters Patent is:

1. A liquid fuel containing a major amount of a branched hydrocarbon fuel oil and a minor amount, sufficient to inhibit against undesirable color formation and sludging, of a compound selected from the group consisting of (1) a polyalkylenepolyamine containing at least three primary amino groups and at least one tertiary amino group and having the formula

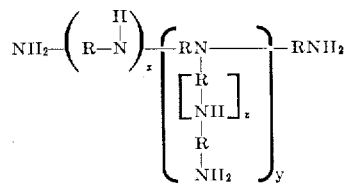

wherein
R is an alkylene group having at least two carbon atoms,
$x$ is an integer of 4 to 24,
$y$ is an integer of 1 to 6, and
$z$ is an integer of 0–6, (2) an acylated branched polyalkylenepolyamine containing at least three primary amino groups and at least one tertiary amino group and having the formula

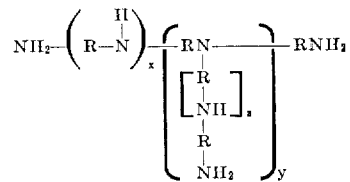

wherein,
R is an alkylene group having at least two carbon atoms,
$x$ is an integer of 4 to 24,
$y$ is an integer of 1 to 6, and
$z$ is an integer of 0–6,
formed by reacting, at a temperature of form about 120° C. to about 300° C., said polyalkylenepolyamine with a compound selected from the group consisting of
 (i) a carboxylic acid having 7–39 carbon atoms and
 (ii) a precursor of said carboxylic acid capable of forming said acid in said reaction, (3) an oxyalkylated branched polyalkylenepolyamine containing at least three primary amino groups and at least one tertiary amino group and having the formula

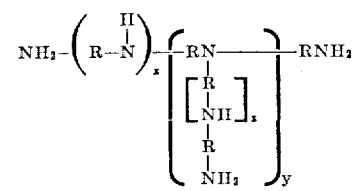

wherein,
R is an alkylene group having at least two carbon atoms,
$x$ is an integer of 4 to 24,
$y$ is an integer of 1 to 6, and
$z$ is an integer of 0–6,
formed by reacting, at a temperature of from about 80° C. to about 200° C. and a pressure of from about 10 p.s.i. to about 200 p.s.i., said polyalkylenepolyamine with an alkylene oxide having 2–8 carbon atoms, (4) an alkylated branched polyalkylenepolyamine containing at least three primary amino groups and at least one tertiary amino group and having the formula

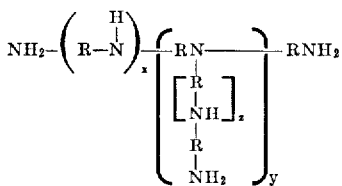

wherein,
R is an alkylene group having at least two carbon atoms,
x is an integer of 4 to 24,
y is an integer of 1 to 6, and
z is an integer of 0–6,
formed by reacting, at a temperature of from about 100° C. to about 250° C., said polyalkylenepolyamine with a hydrocarbon halide alkylating agent having 1 to 30 carbon atoms, (5) an olefinated branched polyalkylenepolyamine containing at least three primary amino groups and at least one tertiary amino group and having the formula

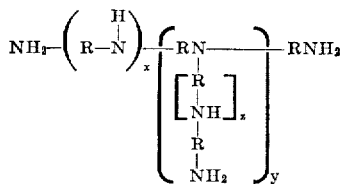

wherein,
R is an alkylene group having at least two carbon atoms,
x is an integer of 4 to 24,
y is an integer of 1 to 6, and
z is an integer of 0–6,
formed by reacting, at a temperature of from about 70° C. to about 100° C., said polyalkylenepolyamine with an olefinating agent selected from the group consisting of acrylonitrile, styrene, butadiene, vinyl ethers and vinyl sulfones, (6) a Schiff base reaction product of a branched polyalkylenepolyamine containing at least three primary amino groups and at least one tertiary amino group and having the formula

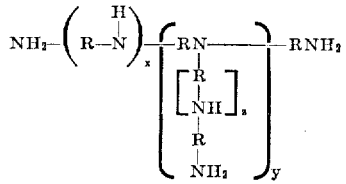

wherein,
R is an alkylene group having at least two carbon atoms,
x is an integer of 4 to 24,
y is an integer of 1 to 6, and
z is an integer of 0–6,
formed by reacting said polyalkylenepolyamine with a compound selected from the group consisting of aldehydes and ketones, (7) an acylated, then oxyalkylated branched polyalkylenepolyamine containing at least three primary amino groups and at least one tertiary amino group and having the hereinabove recited formula, formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 80° C. to about 200° C. and a pressure of from about 10 p.s.i. to about 200 p.s.i., with an alkylene oxide having 2–8 carbon atoms, (8) an oxyalkylated, then acylated branched polyalkylenepolyamine, containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalkylenepolyamine with an alkylene oxide having 2–8 carbon atoms and then reacting said oxyalkylated polyalkylenepolyamine, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction, (9) an alkylated, then acylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1–30 carbon atoms, and then reacting said alkylated polyalkylenepolyamine, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,

(10) an acylated, then alkylated branched polyalkylenepolyamine containing at least three primary amino groups and at least one tertiary amino group and having the hereinabove recited formula formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 100° C. to about 250° C., with a hydrocarbon halide alkylating agent having 1–30 carbon atoms,

(11) an oxyalkylated, then alkylated branched polyalkylenepolyamine containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalklenepolyamine with an alkylene oxide having 2–8 carbon atoms, and then reacting said oxyalkylated polyalkylenepolyamine, at a temperature of from about 100° C. to about 250° C., with a hydrocarbon halide alkylating agent having 1–30 carbon atoms,

(12) a Schiff base reaction product of an acylated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine with a compound selected from the group consisting of aldehydes and ketones,

(13) a Schiff base reaction product of an alkylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1–30 carbon atoms, and then reacting said alkylated polyalkylenepolyamine with a compound selected from the group consisting of aldehydes and ketones,

(14) an oxyalkylated Schiff base reaction product of a branched polyalkylenepolyamine containing at least three primary amino groups and at least one tertiary amino group and having the hereinabove recited formula, formed by reacting said polyalkylenepolyamine with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having 2–8 carbon atoms,

(15) an acylated, then olefinated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 70° C. to about 100° C., with an olefinating agent selected from the group consisting of acrylonitrile, styrene, butadiene, vinyl ethers and vinyl sulfones, and

(16) an alkylated, then olefinated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having from 1–30 carbon atoms, and then reacting said alkylated polyalkylenepolyamine, at a temperature of from about 70° C. to about 100° C., with an olefinating agent selected from the group consisting of acrylonitrile, styrene, butadiene, vinyl ethers and vinyl sulfones.

2. The composition of claim 1 wherein the compound is a branched polyalkylenepolyamine containing at least three primary amino groups and at least one tertiary amino group and having the formula

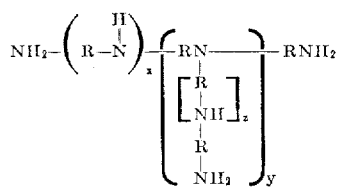

wherein
R is an alkylene group having at least two carbon atoms,
x is an integer of 4 to 24,
y is an integer of 1 to 6, and
z is an integer of 0–6.

3. The composition of claim 1 wherein the compound is an acylated branched polyalkylenepolyamine containing at least three primary amino groups and at least one tertiary amino group and having the formula

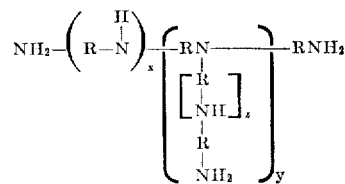

wherein
R is an alkylene group having at least two carbon atoms,
x is an integer of 4 to 24,
y is an integer of 1 to 6, and
z is an integer of 0–6,
formed by reacting, at a temperature of from about 120° C. to about 300° C., said polyalkylenepolyamine with a compound selected from the group consisting of
  (i) a carboxylic acid having 7–39 carbon atoms and
  (ii) a precursor of said carboxylic acid capable of forming said acid in said reaction.

4. The composition of claim 1 wherein the compound is an oxyalkylated branched polyalkylenepolyamine containing at least three primary amino groups and at least one tertiary amino group and having the formula

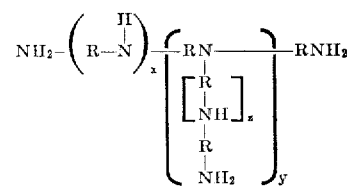

wherein
R is an alkylene group having at least two carbon atoms,
x is an integer of 4 to 24,
y is an integer of 1 to 6, and
z is an integer of 0–6,
formed by reacting, at a temperature of from about 80° C. to about 200° C. and a pressure of from about 10 p.s.i. to about 200 p.s.i., said polyalkylenepolyamine with an alkylene oxide having 2–8 carbon atoms.

5. The composition of claim 1 wherein the compound is an alkylated branched polyalkylenepolyamine containing at least three primary amino groups and at least one tertiary amino group and having the formula

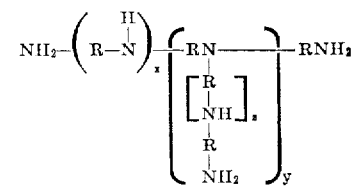

wherein
R is an alkylene group having at least two carbon atoms,
x is an integer of 4 to 24,
y is an integer of 1 to 6, and
z is an integer of 0–6,
formed by reacting, at a temperature of from about 100° C. to about 250° C., said polyalkylenepolyamine with a hydrocarbon halide alkylating agent having 1 to 30 carbon atoms.

6. The composition of claim 1 wherein the compound is an olefinated branched polyalkylenepolyamine containing at least three primary amino groups and at least one tertiary amino group and having the formula

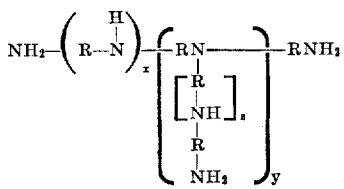

wherein
R is an alkylene group having at least two carbon atoms,
x is an integer of 4 to 24,
y is an integer of 1 to 6, and
z is an integer of 0–6,
formed by reacting, at a temperature of from about 70° C. to about 100° C., said polyalkylenepolyamine with an olefinating agent selected from the group consisting of acrylonitrile, styrene, butadiene, vinyl ethers and vinyl sulfones.

7. The composition of claim 1 wherein the compound is a Schiff base reaction product of a branched polyalkylenepolyamine containing at least three primary amino groups and at least one tertiary amino group and having the formula

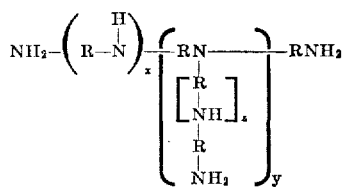

wherein
R is an alkylene group having at least two carbon atoms,
x is an integer of 4 to 24,
y is an integer of 1 to 6, and
z is an integer of 0–6,
formed by reacting said polyalkylenepolyamine with a compound selected from the group consisting of aldehydes and ketones.

8. The composition of claim 1 wherein the compound is an acylated, then oxyalkylated branched polyalkylenepolyamine containing at least three primary amino groups and at least one tertiary amino group and having the formula

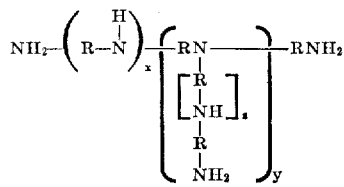

wherein
R is an alkylene group having at least two carbon atoms,
x is an integer of 4 to 24,
y is an integer of 1 to 6, and
z is an integer of 0–6,
formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperture of from about 80° C. to about 200° C. and a pressure of from about 10 p.s.i. to about 200 p.s.i. with an alkylene oxide having 2–8 carbon atoms.

9. A liquid fuel containing a branched major amount of gasoline and a minor amount, sufficient to inhibit icing, of a compound selected from the group consisting of (1) a polyalkylenepolyamine containing at least three primary amino groups and at least one tertiary amino group and having the formula

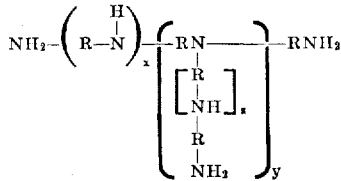

wherein
R is an alkylene group having at least two carbon atoms,
x is an integer of 4 to 24,
y is an integer of 1 to 6, and
z is an integer of 0–6,
(2) an acylated branched polyalkylenepolyamine containing at least three primary amino groups and at least one tertiary amino group and having the formula

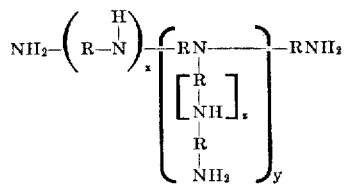

wherein
R is an alkylene group having at least 2 carbon atoms,
x is an integer of 4 to 24,
y is an integer of 1 to 6, and
z is an integer of 0–6,
formed by reacting, at a temperature of from about 120° C. to about 300° C., said polyalkylenepolyamine with a compound selected from the group consisting of
(i) a carboxylic acid having 7–39 carbon atoms and
(ii) a precursor of said carboxylic acid capable of forming said acid in said reaction,
(3) an oxyalkylated branched polyalkylenepolyamine containing at least three primary amino groups and at least one tertiary amino group and having the formula

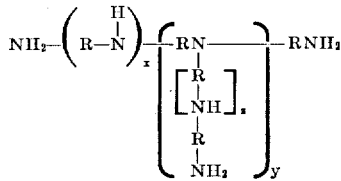

wherein
R is an alkylene group having at least two carbon atoms,
x is an integer of 4 to 24,
y is an integer of 1 to 6, and
z is an integer of 0–6,
formed by reacting, at a temperature of from about 80° C. to about 200° C. and a pressure of from about 10 p.s.i. to about 200 p.s.i., said polyalkylenepolyamine with an alkylene oxide having 2–8 carbon atoms,
(4) an alkylated branched polyalkylenepolyamine containing at least three primary amino groups and at least one tertiary amino group and having the formula

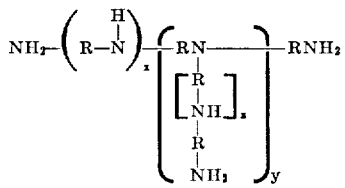

wherein
R is an alkylene group having at least two carbon atoms,
x is an integer of 4 to 24,
y is an integer of 1 to 6, and
z is an integer of 0–6,
formed by reacting, at a temperature of from about 100° C. to about 250° C., said polyalkylenepolyamine with a hydrocarbon halide alkylating agent having 1 to 30 carbon atoms, (5) an olefinated branched polyalkylenepolyamine containing at least three primary amino groups and at least one tertiary amino group and having the formula

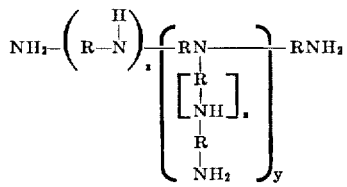

wherein
R is an alkylene group having at least two carbon atoms,
x is an integer of 4 to 24,
y is an integer of 1 to 6, and
z is an integer of 0–6,
formed by reacting, at a temperature of from about 70° C. to about 100° C., said polyalkylenepolyamine with an olefinating agent selected from the group consisting of acrylonitrile, styrene, butadiene, vinyl ethers, and vinyl sulfones, (6) a Schiff base reaction product of a branched polyalkylenepolyamine containing at least three primary amino groups and at least one tertiary amino group and having the formula

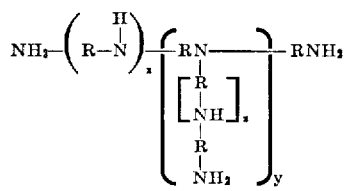

wherein
R is an alkylene group having at least two carbon atoms,
x is an integer of 4 to 24,
y is an integer of 1 to 6, and
z is an integer of 0–6,
formed by reacting said polyalkylenepolyamine with a compound selected from the group consisting of aldehydes and ketones, (7) an acylated, then oxylated branched polyalkylenepolyamine containing at least three primary amino groups and at least one tertiary amino group and having the hereinabove recited formula, formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then re-acting said acylated polyalkylenepolyamine, at a temperature of from about 80° C. to about 200° C. and a pressure of from about 10 p.s.i. to about 200 p.s.i., with an alkylene oxide having 2–8 carbon atoms, (8) an oxyalkylated, then acylated branched polyalkylenepolyamine, containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalkylenepolyamine with an alkylene oxide having 2–8 carbon atoms and then reacting said oxyalkylated polyalkylenepolyamine, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction, (9) an alkylated, then acylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1–30 carbon atoms, and then reacting said alkylated polyalkylenepolyamine, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,

(10) an acylated, then alkylated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 100° C. to about 250° C., with a hydrocarbon halide alkylating agent having 1–30 carbon atoms,

(11) an oxyalkylated, then alkylated branched polyalkylenepolyamine containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalkylenepolyamine with an alkylene oxide having 2–8 carbon atoms, and then reacting said oxyalkylated polyalkylenepolyamine, at a temperature of from about 100° C. to about 250° C., with a hydrocarbon halide alkylating agent having 1–30 carbon atoms,

(12) a Schiff base reaction product of an acylated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine with a compound selected from the group consisting of aldehydes and ketones,

(13) a Schiff base reaction product of an alkylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1-30 carbon atoms, and then reacting said alkylated polyalkylenepolyamine with a compound selected from the group consisting of aldehydes and ketones,

(14) an oxyalkylated Schiff base reaction product of a branched polyalkylenepolyamine containing at least three primary amino groups and at least one tertiary amino group and having the hereinabove recited formula, formed by reacting said polyalkylenepolyamine with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having 2-8 carbon atoms,

(15) an acylated, then olefinated branched polyalkylenepolyamine containing at least three primary amino groups and at elast one tertiary amino group and having the hereinabove recited formula, formed by reacting, at a temperature of from about 120° C. to about 300° C., said polyalkylenepolyamine with an acylating agent selected from the group consisting of
(i) a carboxylic acid having 7–39 carbon atoms and
(ii) a precursor of said carboxylic acid capable of forming said acid in said reaction, and then reacting said acylated polyalkylenepolyamine, at a temperature of from about 70° C. to about 100° C., with an olefinating agent selected from the group consisting of acrylonitrile, styrene, butadiene, vinyl ethers and vinyl sulfones, and

(16) an alkylated, then olefinated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having from 1–30 carbon atoms, and then reacting said alkylated polyalkylenepolyamine, at a temperature of from about 70° C. to about 100° C., with an olefinating agent selected from the group consisting of acrylonitrile, styrene, butadiene, vinyl ethers and vinyl sulfones.

10. The composition of claim 9 wherein the compound is a branched polyalkylenepolyamine containing at least three primary amino groups and at least one tertiary amino group and having the formula

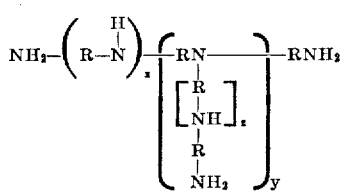

wherein

R is an alkylene group having at least two carbon atoms,
$x$ is an integer of 4 to 24,
$y$ is an integer of 1 to 6, and
$z$ is an integer of 0–6.

11. The composition of claim 9 wherein the compound is an acylated branched polyalkylenepolyamine containing at least three primary amino groups and at least one tertiary amino group and having the formula

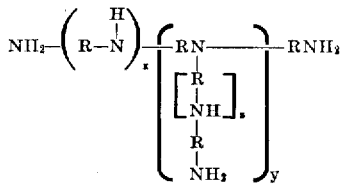

wherein

R is an alkylene group having at least two carbon atoms,
$x$ is an integer of 4 to 24,
$y$ is an integer of 1 to 6, and
$z$ is an integer of 0–6, formed by reacting, at a temperature of from about 120° C. to about 300° C., said polyalkylenepolyamine with a compound selected from the group consisting of
(i) a carboxylic acid having 7–39 carbon atoms and
(ii) a precursor of said carboxylic acid capable of forming said acid in said reaction.

12. The compsition of claim 9 wherein the compound is an oxyalkylated branched polyalkylenepolyamine containing at least three primary amino groups and at least one tertiary amino group and having the formula

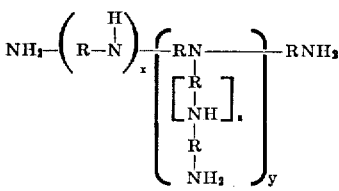

wherein

R is an alkylene group having at least two carbon atoms,
$x$ is an integer of 4 to 24,
$y$ is an integer of 1 to 6, and
$z$ is an integer of 0–6, formed by reacting, at a temperature of from about 80° C. to about 200° C. and a pressure of from about 10 p.s.i. to about 200 p.s.i., said polyalkylenepolyamine with an alkylene oxide having 2–8 carbon atoms.

13. The composition of claim 9 wherein the compound is an alkylated branched polyalkylenepolyamine containing at least three primary amino groups and at least one tertiary amino group and having the formula

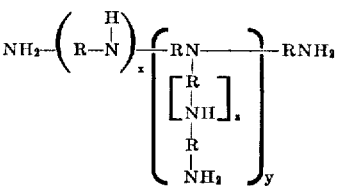

wherein

R is an alkylene group having at least two carbon atoms,
$x$ is an integer of 4 to 24,
$y$ is an integer of 1 to 6, and
$z$ is an integer of 0–6, formed by reacting, at a temperature of from about 100° C. to about 250° C., said polyalkylenepolyamine with a hydrocarbon halide alkylating agent having 1 to 30 carbon atoms.

14. The composition of claim 9 wherein the compound is an olefinated branched polyalkylenepolyamine containing at least three primary amino groups and at least one tertiary amino group and having the formula

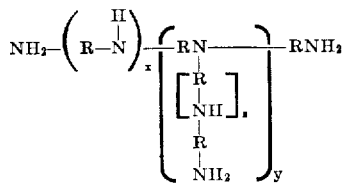

wherein

R is an alkylene group having at least two carbon atoms,
x is an integer of 4 to 24,
y is an integer of 1 to 6, and
z is an integer of 0–6, formed by reacting, at a temperature of from about 70° C. to about 100° C., said polyalkylenepolyamine with an olefinating agent selected from the group consisting of acrylonitrile, styrene, butadiene, vinyl ethers and vinyl sulfones.

15. The composition of claim 9 wherein the compound is a Schiff base reaction product of a branched polyalkylenepolyamine containing at least three primary amino groups and at least one tertiary amino group and having the formula

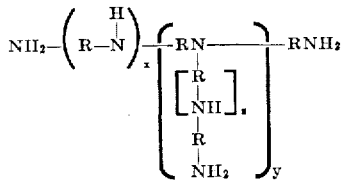

wherein

R is an alkylene group having at least two carbon atoms,
x is an integer of 4 to 24,
y is an integer of 1 to 6, and
z is an integer of 0–6, formed by reacting said polyalkylenepolyamine with a compound selected from the group consisting of aldehydes and ketones.

16. The composition of claim 9 wherein the compound is an acylated, then oxyalkylated branched polyalkylenepolyamine containing at least three primary amino groups and at least one tertiary amino group and having the formula

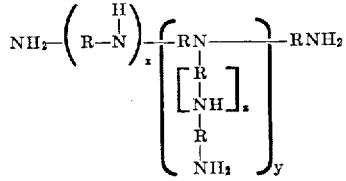

wherein

R is an alkylene group having at least two carbon atoms,
x is an integer of 4 to 24,
y is an integer of 1 to 6, and
z is an integer of 0–6, formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 80° C. to about 200° C. and a pressure of from about 10 p.s.i. to about 200 p.s.i., with an alkylene oxide having 2–8 carbon atoms.

17. A liquid fuel containing a major amount of water-containing distillate hydrocarbon fuel and a minor amount, sufficient to inhibit fog formation therein, of a compound selected from the group consisting of (1) a branched polyalkylenepolyamine containing at least three primary amino groups and at least one tertiary amino group and having the formula

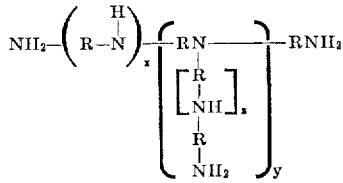

wherein

R is an alkylene group having at least two carbon atoms,
x is an integer of 4 to 24,
y is an integer of 1 to 6, and
z is an integer of 0–6, (2) an acylated branched polyalkylenepolyamine containing at least three primary amino groups and at least one tertiary amino group and having the formula

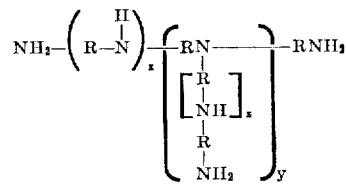

wherein

R is an alkylene group having at least two carbon atoms,
x is an integer of 4 to 24,
y is an integer of 1 to 6, and
z is an integer of 0–6, formed by reacting, at a temperature of from about 120° C. to about 300° C., said polyalkylenepolyamine with a compound selected from the group consisting of
(i) a carboxylic acid having 7–39 carbon atoms, and
(ii) a precursor of said carboxylic acid capable of forming said acid in said reaction, (3) an oxyalkylated branched polyalkylenepolyamine containing at least three primary amino groups and at least one tertiary amino group and having the formula

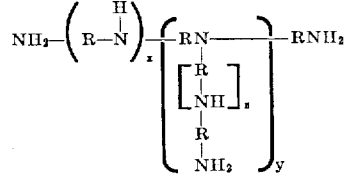

wherein

R is an alkylene group having at least two carbon atoms,
x is an integer of 4 to 24,
y is an integer of 1 to 6, and
z is an integer of 0–6, formed by reacting, at a temperature of from about 80° C. to about 200° C. and a pressure of from about 10 p.s.i. to about 200 p.s.i., said polyalkylenepolyamine with an alkylene oxide having 2–8 carbon atoms, (4) an alkylated branched polyalklenepolyamine containing at least three primary amino groups and at least one tertiary amino group and having the formula

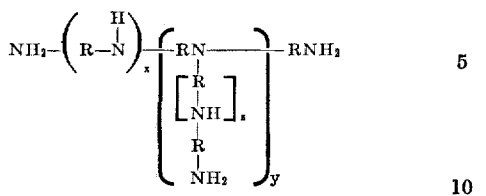

wherein

R is an alkylene group having at least two carbon atoms, x is an integer of 4 to 24, y is an integer of 1 to 6, and z is an integer of 0–6, formed by reacting, at a temperature of from about 100° C. to about 250° C., said polyalkylenepolyamine with a hydrocarbon halide alkylating agent having 1 to 30 carbon atoms, (5) an olefinated branched polyalkylenepolyamine containing at least three primary amino groups and at least one tertiary amino group and having the formula

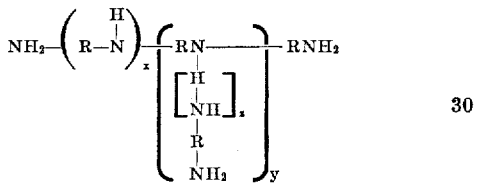

wherein

R is an alkylene group having at least two carbon atoms, x is an integer of 4 to 24, y is an integer of 1 to 6, and z is an integer of 0–6, formed by reacting, at a temperature of from about 70° C. to about 100° C., said polyalkylenepolyamine with an olefinating agent selected from the group consisting of acrylonitrile, styrene, butadiene, vinyl ethers and vinyl sulfones, (6) a Schiff base reaction product of a branched polyalkylenepolyamine containing at least three primary amino groups and at least one tertiary amino group and having the formula

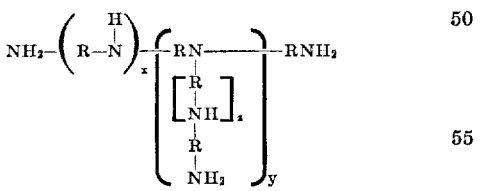

wherein

R is an alkylene group having at least two carbon atoms, x is an integer of 4 to 24, y is an integer of 1 to 6, and z is an integer of 0–6, formed by reacting said polyalkylenepolyamine with a compound selected from the group consisting of aldehydes and ketones, (7) an acylated, then oxyalkylated branched polyalkylenepolyamine containing at least three primary amino groups and at least one tertiary amino group and having the hereinabove recited formula, formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 80° C. to about 200° C. and a pressure of from about 10 p.s.i. to about 200 p.s.i., with an alkylene oxide having 2–8 carbon atoms, (8) an oxyalkylated, then acylated branched polyalkylenepolyamine, containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalkylenepolyamine with an alkylene oxide having 2–8 carbon atoms and then reacting said oxyalkylated polyalkylenepolyamine, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction, (9) an alkylated, then acylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1–30 carbon atoms, and then reacting said alkylated polyalkylenepolyamine, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,

(10) an acylated, then alkylated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 100° C. to about 250° C., with a hydrocarbon halide alkylating agent having 1–30 carbon atoms,

(11) an oxyalkylated, then alkylated branched polyalkylenepolyamine containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalkylenepolyamine with an alkylene oxide having 2–8 carbon atoms, and then reacting said oxyalkylated polyalkylenepolyamine, at a temperature of from about 100° C. to about 250° C., with a hydrocarbon halide alkylating agent having 1–30 carbon atoms,

(12) a Schiff base reaction product of an acylated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine with a compound selected from the group consisting of aldehydes and ketones,

(13) a Schiff base reaction product of an alkylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1–30 carbon atoms, and then reacting said alkylated polyalkylenepolyamine with a compound selected from the group consisting of aldehydes and ketones,

(14) an oxyalkylated Schiff base reaction product of a branched polyalkylenepolyamine containing at least three primary amino groups and at least one tertiary amino group and having the hereinabove recited formula, formed by reacting said polyalkylenepolyamine with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having 2–8 carbon atoms,

(15) an acylated, then olefinated branched polyalkyenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of
(i) a carboxylic acid having 7–39 carbon atoms and
(ii) a precursor of said carboxylic acid capable of forming said acid in said reaction, and then reacting said acylated polyalkylenepolyamine, at a temperature of from about 70° C. to about 100° C., with an olefinating agent selected from the group consisting of acrylonitrile, styrene, butadiene, vinyl ethers and vinyl sulfones, and

(16) an alkylated, then olefinated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having from 1–30 carbon atoms, and then reacting said alkylated polyalkylenepolyamine, at a temperature of from about 70° C. to about 100° C., with an olefinating agent selected from the group consisting of acrylonitrile, styrene, butadiene, vinyl ethers and vinyl sulfones.

18. The composition of claim 17 wherein the compound is a branched polyalkylenepolyamine containing at least three primary amino groups and at least one tertiary amino group and having the formula

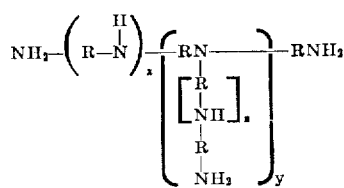

wherein
R is an alkylene group having at least two carbon atoms,
$x$ is an integer of 4 to 24,
$y$ is an integer of 1 to 6, and
$z$ is an integer of 0–6.

19. The composition of claim 17 wherein the compound is an acylated branched polyalkylenepolyamine containing at least three primary amino groups and at least one tertiary amino group and having the formula

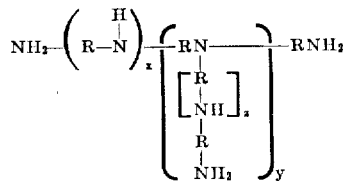

wherein
R is an alkylene group having at least two carbon atoms,
$x$ is an integer of 4 to 24,
$y$ is an integer of 1 to 6, and
$z$ is an integer of 0–6, formed by reacting, at a temperature of from about 120° C. to about 300° C., said polyalkylenepolyamine with a compound selected from the group consisting of
(i) a carboxylic acid having 7–39 carbon atoms and
(ii) a precursor of said carboxylic acid capable of forming said acid in said reaction.

20. The composition of claim 17 wherein the compound is an oxyalkylated branched polyalkylenepoyamine containing at least three primary amino groups and at least one tertiary amino group and having the formula

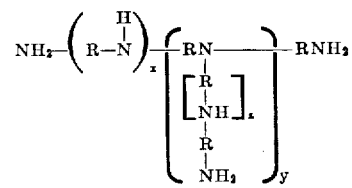

wherein
R is an alkylene group having at least two carbon atoms,
$x$ is an integer of 4 to 24,
$y$ is an integer of 1 to 6, and
$z$ is an integer of 0–6, formed by reacting, at a temperature of from about 80° C. to about 200° C. and a pressure of from about 10 p.s.i. to about 200 p.s.i., said polyalkylenepolyamine with an alkyleneoxide having 2–8 carbon atoms.

21. The composition of claim 17 wherein the compound is an alkylated branched polyalkylenepolyamine containing at least three primary amino groups and at least one tertiary amino groups and having the formula

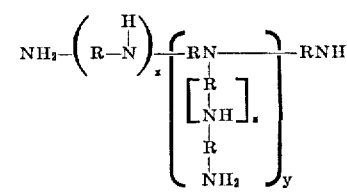

wherein
R is an alkylene group having at least two carbon atoms,
$x$ is an integer of 4 to 24,
$y$ is an integer of 1 to 6, and
$z$ is an integer of 0–6, formed by reacting, at a temperature of from about 100° C. to about 250° C., said polyalkylenepolyamine with a hydrocarbon halide alkylating agent having 1 to 30 carbon atoms.

22. The composition of claim 17 wherein the compound is an olefinated branched polyalkylenepolyamine containing at least three primary amino groups and at least one tertiary amino group and having the formula

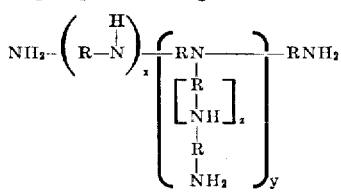

wherein
R is an alkylene group having at least two carbon atoms,
x is an integer of 4 to 24,
y is an integer of 1 to 6, and
z is an integer of 0–6, formed by reacting, at a temperature of from about 70° C. to about 100° C., said polyalkylenepolyamine with an olefinating agent selected from the group consisting of acrylonitrile, styrene, butadiene, vinyl ethers and vinyl sulfones.

23. The composition of claim 17 wherein the compound is a Schiff base reaction product of a branched polyalkylenepolyamine containing at least three primary amino groups and at least one tertiary amino group and having the formula

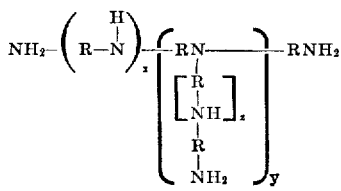

wherein
R is an alkylene group having at least two carbon atoms,
x is an integer of 4 to 24,
y is an integer of 1 to 6, and
z is an integer of 0–6, formed by reacting said polyalkylenepolyamine with a compound selected from the group consisting of aldehydes and ketones.

24. The composition of claim 17 wherein the compound is an acylated, then oxyalkylated branched polyalkylenepolyamine containing at least three primary amino groups and at least one tertiary amino group and having the formula

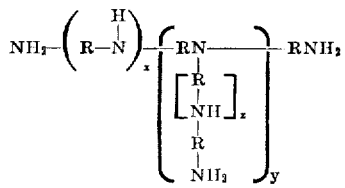

wherein
R is an alkylene group having at least two carbon atoms,
x is an integer of 4 to 24,
y is an integer of 1 to 6, and
z is an integer of 0–6, formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 80° C. to about 200° C. and a pressure of from about 10 p.s.i. to about 200 p.s.i., with an alkylene oxide having 2–8 carbon atoms.

25. A liquid fuel containing a major amount of a copper-containing hydrocarbon fuel and a minor amount, sufficient to deactivate the copper contained therein, of a compound selected from the group consisting of (1) a branched polyalkylenepolyamine containing at least three primary amino groups and at least one tertiary amino group and having the formula

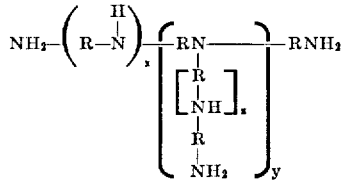

wherein
R is an alkylene group having at least two carbon atoms,
x is an integer of 4 to 24,
y is an integer of 1 to 6, and
x is an integer of 0–6, (2) an acylated branched polyalklenepolyamine containing at least three primary amino groups and at least one tertiary amino group and having the formula

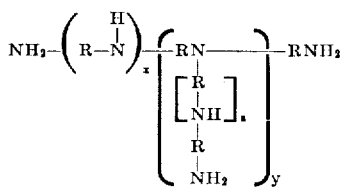

wherein
R is an alkylene group having at least two carbon atoms,
x is an integer of 4 to 24,
y is an integer of 1 to 6, and
z is an integer of 0–6, formed by reacting, at a temperature of from about 120° C. to about 300° C., said polyalkylenepolyamine with a compound selected from the group consisting of
(i) a carboxylic acid having 7–39 carbon atoms and
(ii) a precursor of said carboxylic acid, capable of forming said acid in said reaction, (3) an oxyalkylated branched polyalkylenepolyamine containing at least three primary amino groups and at least one tertiary amino group and having the formula

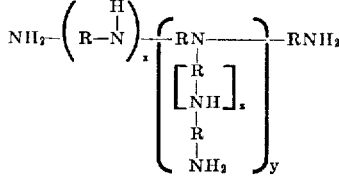

wherein
R is an alkylene group having at least two carbon atoms,
x is an integer of 4 to 24,
y is an integer of 1 to 6, and
z is an integer of 0–6, formed by reacting, at a temperature of from about 80° C. to about 200° C. and a pressure of from about 10 p.s.i. to about 200 p.s.i., said polyalkylenepolyamine with an alkylene oxide having 2–8 carbon atoms, (4) an alkylated branched polyalkylenepolyamine containing at least three primary amino groups and at least one tertiary amino group and having the formula

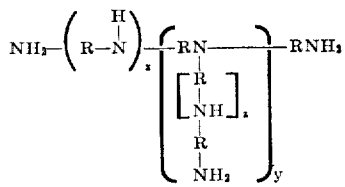

wherein
R is an alkylene group having at least two carbon atoms,
x is an integer of 4 to 24,
y is an integer of 1 to 6, and
z is an integer of 0–6, formed by reacting, at a temperature of from about 100° C. to about 250° C., said polyalkylenepolyamine with a hydrocarbon halide alkylating agent having 1 to 30 carbon atoms, (5) an olefinated branched polyalkylenepolyamine containing at least three primary amino groups and at least one tertiary amino group and having the formula

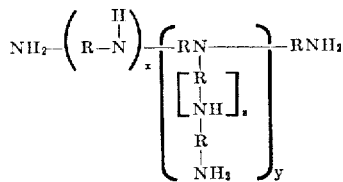

wherein
R is an alkylene group having at least two carbon atoms,
x is an integer of 4 to 24,
y is an integer of 1 to 6, and
z is an integer of 0–6, formed by reacting, at a temperature of from about 70° C. to about 100° C., said polyalklenepolyamine with an olefinating agent selected from the group consisting of acrylonitrile, styrene, butadiene, vinyl ethers and vinyl sulfones, (6) a Schiff base reaction product of a branched polyalkylenepolyamine containing at least three primary amino groups and at least one tertiary amino group and having the formula

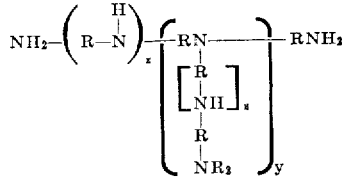

wherein
R is an alkylene group having at least two carbon atoms,
x is an integer of 4 to 24,
y is an integer of 1 to 6, and
z is an integer of 0–6, formed by reacting said polyalkylenepolyamine with a compound selected from the group consisting of aldehydes and ketones, (7) an acylated, then oxyalkylated branched polyalkylenepolyamine containing at least three primary amino groups and at least one tertiary amino group and having the hereinabove recited formula, formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 80° C. to about 200° C. and a pressure of from about 10 p.s.i. to about 200 p.s.i., with an alkylene oxide having 2–8 carbon atoms, (8) an oxyalkylated, then acylated branched polyalkylenepolyamine, containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalkylenepolyamine with an alkylene oxide having 2–8 carbon atoms and then reacting said oxyalkylated polyalkylenepolyamine, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction, (9) an alkylated, then acylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1–30 carbon atoms, and then reacting said alkylated polyalkylenepolyamine, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,

(10) an acylated, then alkylated branched polyalkylenepolyamine containing at least three primary amino groups and at least one tertiary amino group and having the hereinabove recited formula, formed by reacting, at a temperature of from about 120° C. to about 300° C., said polyalklenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 100° C. to about 250° C., with a hydrocarbon halide alkylating agent having 1–30 carbon atoms,

(11) an oxyalkylated, then alkylated branched polyalkylenepolyamine containing at least three primary amino groups and at least one tertiary amino group and having the hereinabove recited formula, formed by reacting, at a temperature of from about 80° C. to about 200° C., and a pressure of from about 10 p.s.i. to about 200 p.s.i., said polyalkylenepolyamine with an alkylene oxide having 2–8 carbon atoms, and then reacting said oxyalkylated polyalkylenepolyamine, at a temperature of from about 100° C. to about 250° C., with a hydrocarbon halide alkylating agent having 1–30 carbon atoms,

(12) a Schiff base reaction product of an acylated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine with a compound selected from the group consisting of aldehydes and ketones,

(13) a Schiff base reaction product of an alkylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1–30 carbon atoms, and then reacting said alkylated polyalkylenepolyamine with a compound selected from the group consisting of aldehydes and ketones,

(14) an oxyalkylated Schiff base reaction product of a branched polyalkylenepolyamine containing at least three primary amino groups and at least one tertiary amino group and having the hereinabove recited formula, formed by reacting said polyalkylenepolyamine with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having 2–8 carbon atoms,

(15) an acylated, then olefinated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 70° C. to about 100° C., with an olefinating agent seelcted from the group consisting of acrylonitrile, styrene, butadiene, vinyl ethers and vinyl sulfones, and

(16) an alkylated, then olefinated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having from 1–30 carbon atoms, and then reacting said alkylated polyalkylenepolyamine, at a temperature of from about 70° C. to about 100° C., with an olefinating agent selected from the group consisting of acrylonitrile, styrene, butadiene, vinyl ethers and vinyl sulfones.

26. The composition of claim 25 wherein the compound is a branched polyakylenepolyamine containing at least three primary amino groups and at least one tertiary amino group and having the formula

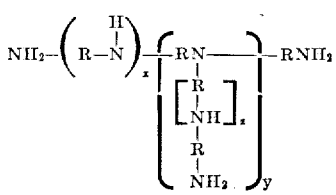

wherein

R is an alkylene group having at least two carbon atoms, $x$ is an interger of 4 to 24, $y$ is an integer of 1 to 6, and $z$ is an integer of 0–6.

27. The composition of claim 25 wherein the compound is an acylated branched polyalkylenepolyamine containing at least three primary amino groups and at least one tertiary amino group and having the formula

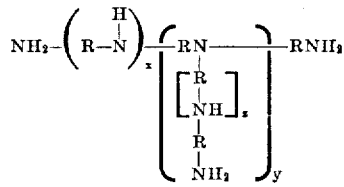

wherein

R is an alkylene group having at least two carbon atoms, $x$ is an integer of 4 to 24, $y$ is an integer of 1 to 6, and $z$ is an integer of 0–6, formed by reacting at a temperature of from about 120° C. to about 300° C., said polyalkylenepolyamine with a compound selected from the group consisting of (i) a carboxylic acid having 7–39 carbon atoms and (ii) a precursor of said carboxylic acid capable of forming said acid in said reaction.

28. The composition of claim 25 wherein the compound is an oxyalkylated branched polyalkylenepolyamine containing at least three primary amino groups and at least one tertiary amino group and having the formula

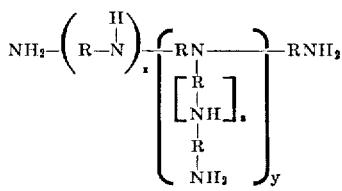

wherein

R is an alkylene group having at least two carbon atoms, $x$ is an integer of 4 to 24, $y$ is an integer of 1 to 6, and $z$ is an integer of 0–6, formed by reacting, at a temperature of from about 80° C. to about 200° C. and a pressure of from about 10 p.s.i. to about 200 p.s.i., said polyalkylenepolyamine with an alkylene oxide having 2–8 carbon atoms.

29. The composition of claim 25 wherein the compound is an alkylated branched polyalkylenepolyamine containing at least three primary amino groups and at least one tertiary amino group and having the formula

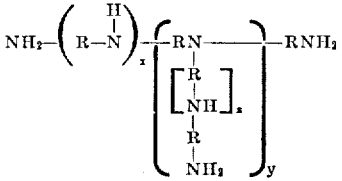

wherein

R is an alkylene group having at least two carbon atoms, $x$ is an integer of 4 to 24, $y$ is an integer of 1 to 6, and $z$ is an integer of 0–6, formed by reacting, at a temperature of from about 100° C. to about 250° C., said polyalkylenepolyamine with a hydrocarbon-halide alkylating agent having 1 to 30 carbon atoms.

30. The composition of claim 25 wherein the compound is an olefinated branched polyalkylenepolyamine containing at least three primary amino groups and at least one tertiary amino group and having the formula

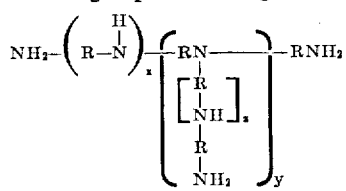

wherein
R is an alkylene group having at least two carbon atoms,
x is an integer of 4 to 24,
y is an integer of 1 to 6, and
z is an integer of 0–6,
formed by reacting, at a temperature of from about 70° C. to about 100° C., said polyalkylenepolyamine with an olefinating agent selected from the group consisting of acrylonitrile, styrene, butadiene, vinyl ethers and vinyl sulfones.

31. The composition of claim 25 wherein the compound is a Schiff base reaction product of a branched polyalkylenepolyamine containing at least three primary amino groups and at least one tertiary amino group and having the formula

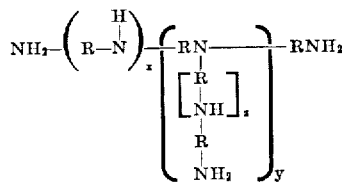

wherein
R is an alkylene group having at least two carbon atoms,
x is an integer of 4 to 24,
y is an integer of 1 to 6, and
z is an integer of 0–6,
formed by reacting said polyalkylenepolyamine with a compound selected from the group consisting of aldehydes and ketones.

32. The composition of claim 25 wherein the compound is an acylated, then oxyalkylated branched polyalkylenepolyamine containing at least three primary amino groups and at least one tertiary amino group and having the formula

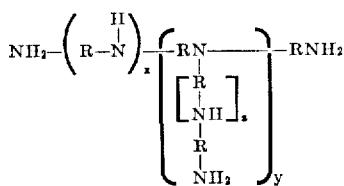

wherein
R is an alkylene group having at least two carbon atoms,
x is an integer of 4 to 24,
y is an integer of 1 to 6, and
z is an integer of 0–6,
formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 80° C. to about 200° C. and a pressure of from about 10 p.s.i. to about 200 p.s.i., with an alkylene oxide having 2–8 carbon atoms.

References Cited by the Examiner
UNITED STATES PATENTS

| | | | |
|---|---|---|---|
| 2,272,489 | 2/1942 | Ulrich | 260—239 |
| 2,530,650 | 11/1950 | Chenicek | 260—239 |
| 2,854,324 | 9/1958 | Shen et al. | 44—71 |
| 2,996,365 | 8/1961 | De Groote et al. | 44—66 |
| 3,024,506 | 7/1962 | Cole et al. | 44—73 |
| 3,092,475 | 6/1963 | Cole et al. | 44—72 |
| 3,114,702 | 12/1963 | Thompson | 44—72 |

DANIEL E. WYMAN, *Primary Examiner.*

Y. M. HARRIS, *Assistant Examiner.*